United States Patent
Ishikawa

(10) Patent No.: US 10,607,574 B2
(45) Date of Patent: Mar. 31, 2020

(54) INFORMATION PROCESSING DEVICE AND INFORMATION PROCESSING METHOD

(71) Applicant: CANON KABUSHIKI KAISHA, Tokyo (JP)

(72) Inventor: Rei Ishikawa, Wako (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 534 days.

(21) Appl. No.: 14/190,552

(22) Filed: Feb. 26, 2014

(65) Prior Publication Data
US 2014/0240364 A1    Aug. 28, 2014

(30) Foreign Application Priority Data

Feb. 28, 2013  (JP) ................................. 2013-038973
Nov. 26, 2013  (JP) ................................. 2013-243943

(51) Int. Cl.
*G09G 5/34*     (2006.01)
(52) U.S. Cl.
CPC ....................................... *G09G 5/34* (2013.01)
(58) Field of Classification Search
CPC ........................................................ G09G 5/34
USPC ........................................................ 345/684
See application file for complete search history.

(56) References Cited

U.S. PATENT DOCUMENTS

| | | | | |
|---|---|---|---|---|
| 8,166,410 B2* | 4/2012 | Tadman | ............... | G01C 21/343 |
| | | | | 701/425 |
| 2008/0168404 A1* | 7/2008 | Ording | ................. | G06F 3/0485 |
| | | | | 715/863 |
| 2010/0083166 A1* | 4/2010 | Happonen | ............. | G06F 3/0485 |
| | | | | 715/784 |
| 2010/0125786 A1* | 5/2010 | Ozawa | ................ | G06F 3/04845 |
| | | | | 715/702 |
| 2013/0055083 A1* | 2/2013 | Fino | ...................... | G06F 3/0485 |
| | | | | 715/716 |
| 2013/0143657 A1* | 6/2013 | Overton | ................ | G06F 3/0485 |
| | | | | 463/37 |
| 2013/0174082 A1* | 7/2013 | Khandker | ............. | G06F 3/0485 |
| | | | | 715/780 |

FOREIGN PATENT DOCUMENTS

JP          2008-112214 A          5/2008

* cited by examiner

*Primary Examiner* — Tadesse Hailu
*Assistant Examiner* — Darrin Hope
(74) *Attorney, Agent, or Firm* — Carter, DeLuca & Farrell LLP

(57) ABSTRACT

In order to provide a technology with which an area that meets the intention of a user is scrolled when the user gives a scroll instruction while specifying a part of an image, provided is an information processing device which performs control for scrolling an image that is displayed on a display unit and that includes a scrollable first area and a second area which is a part of the first area and which is scrollable independently, the information processing device including: a unit configured to receive information that specifies a point on the display unit and that instructs to scroll an image corresponding to the specified point; a unit configured to determine, when the specified point corresponds to the second area, whether the first area is to be scrolled or the second area is to be scrolled independently.

15 Claims, 15 Drawing Sheets

| | | |
|---|---|---|
| 201 — AREA | AREA ID | DISPLAY RANGE |
| | ID_bg | (0,0,320,960) — 206 |
| | ID_map | (20,500,280,200) — 207 |
| 208 — MAXIMUM OPERATION INTERVAL | 500ms | |
| 209 — SCROLL INSTRUCTION INVALIDATED AREA | (0, 600, 400, 800) | |
| 202 — SCROLL TIME | 2012/01/01 12:00:00.000 | |
| 203 — SCROLL TARGET AREA | ID_bg | |
FIG. 2A
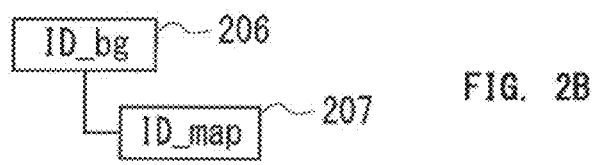
FIG. 2B
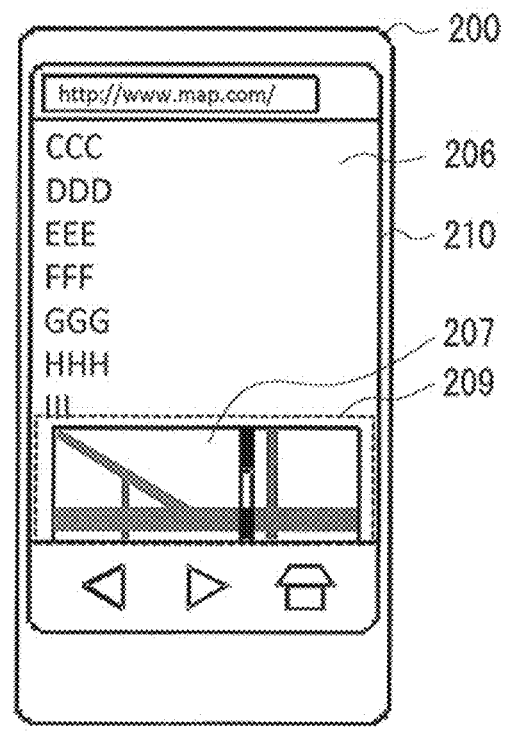
FIG. 3

| | | | |
|---|---|---|---|
| 201 — | AREA | 204 AREA ID | 205 DISPLAY RANGE |
| | | ID_bg | (0,0,320,960) — 206 |
| | | ID_map | (20,500,280,200) — 207 |
| 208 — | MAXIMUM OPERATION INTERVAL | 500ms | |
| 209 — | SCROLL INSTRUCTION INVALIDATED AREA | (0, 600, 400, 800) | |
| 704 — | SCROLL SPEED THRESHOLD | 100pixel/s | |
| 705 — | DISTANCE THRESHOLD | 20pixel | |
| 706 — | MOVING SPEED THRESHOLD | 20pixel/s | |
| 707 — | MOVING DIRECTION THRESHOLD | 60° | |
| 202 — | SCROLL TIME | 2012/01/01 12:00:00.000 | |
| 203 — | SCROLL TARGET AREA | ID_bg | |
| 708 — | TOUCH START POINT | | |
| 709 — | TOUCH POINT MOVING SPEED | | |
| 710 — | TOUCH POINT MOVING DIRECTION | | |

FIG. 8

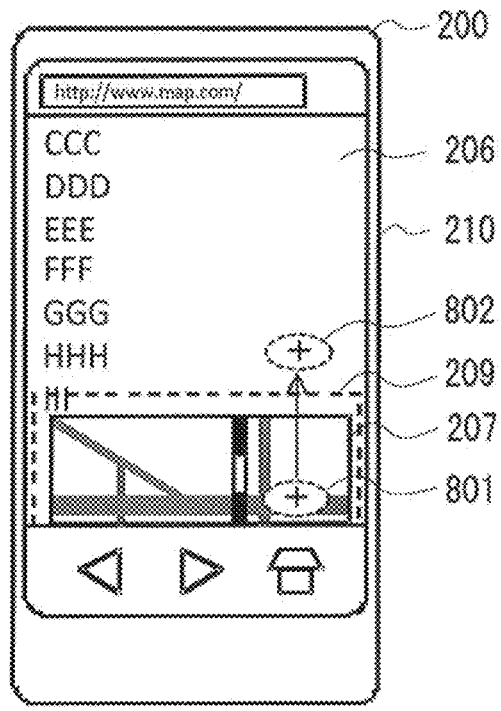
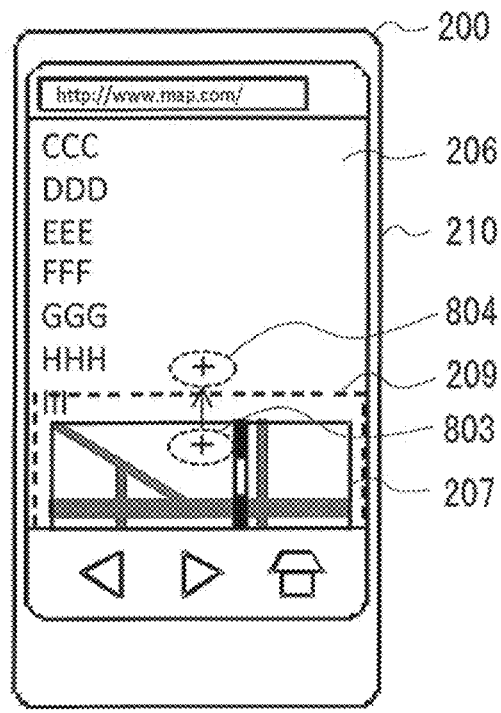
FIG. 9A          FIG. 9B
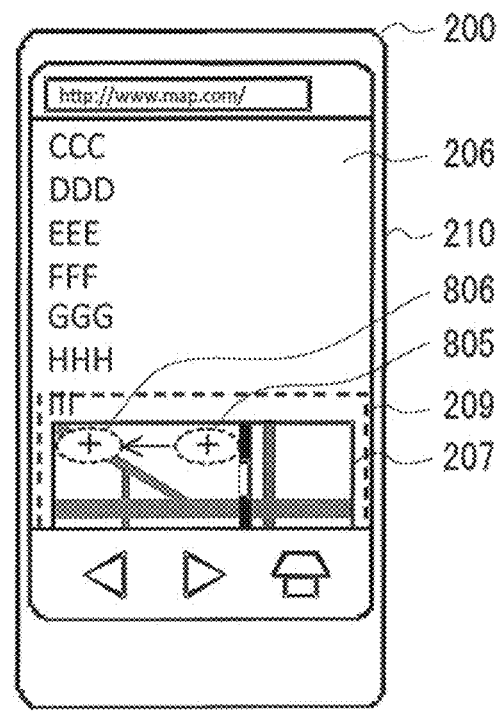
FIG. 9C

| AREA ID | DISPLAY RANGE | |
|---------|---------------|---|
| ID_bg | (0,0,320,960) | ~206 |
| ID_map | (20,500,280,200) | ~207 |
| ID_msg | (50,600,30,50) | ~903 |

… 
INFORMATION PROCESSING DEVICE AND INFORMATION PROCESSING METHOD

BACKGROUND OF THE INVENTION

Field of the Invention

The present invention relates to a technology for controlling a target of image scroll operation in an information processing device.

Description of the Related Art

A user operating an information processing device sometimes scrolls the entire image displayed on a screen of the information processing apparatus in order to bring a continuation to the image displayed on the screen into view. Scroll operation as this is executed by the user's drag operation in some cases. In other cases, the scroll operation is executed by rotating a rotary operating part (wheel) installed in a mouse or the like while displaying the cursor at a desired point on the screen.

In the following, "drag operation" refers to a series of operation steps that includes specifying a point on the screen with a touch panel or a pointing device such as a mouse and subsequently moving the point while keeping specifying the point. This may be called flick operation in the case of a gesture in which the screen is flicked with a finger.

A browser device disclosed in Japanese Patent Application Laid-open No. 2008-112214 is known as a technology with which a scrollable area in a digital document and a sub-area within the area which is another scrollable area can be in conjunction with each other. This browser device additionally records information that needs to be supplied in step with the scrolling, by obtaining the information through communication. This prevents the storage area from increasing in size.

Japanese Patent Application Laid-open No. 2008-112214 does not disclose an action against scroll instruction operation that is performed by mistake while one area is scrolled and another scrollable area brought into view by the scrolling is specified. For instance, as illustrated in FIG. 16, a map area 1202 may be brought into view while a document 1201 is being scrolled as a sub-area of the document 1201. If a user unaware of the map area 1202 accidentally drags the map area 1202 as scroll instruction operation when the user's actual intention is to continue scrolling the document 1201, the browser device invariably shifts to scrolling inside the map area 1202. Then the user cannot get the result that he/she intended.

SUMMARY OF THE INVENTION

An embodiment of the present invention has been made in view of the example of the related art described above, and an object of the present invention is to provide a technology with which an area that meets the intention of a user is scrolled when the user gives a scroll instruction while specifying a part of an image.

In order to attain the above-mentioned object, according to an embodiment of the present invention, there is provided an information processing device, which performs control for scrolling an image that is displayed on a display unit and that includes a scrollable first area and a second area which is a part of the first area and which is scrollable independently, the information processing device including: a receiving unit configured to receive information that specifies a point on the display unit and that instructs to scroll an image corresponding to the specified point; a determination unit configured to determine, when the specified point corresponds to the second area, whether the first area is to be scrolled or the second area is to be scrolled independently, based on whether or not the specified point is contained in a particular range of the display unit which is determined from a direction in which an image has been scrolled by a last scroll instruction; and a control unit configured to perform one of scrolling the first area and scrolling the second area independently, depending on a result of the determination in the determination unit.

With the information processing device according to the embodiment, the area that meets the intention of the user is scrolled when the user gives the scroll instruction while specifying the part of the image.

Further features of the present invention will become apparent from the following description of exemplary embodiments (with reference to the attached drawings).

BRIEF DESCRIPTION OF THE DRAWINGS

FIGS. 2A and 2B are respectively a diagram exemplifying data that is stored in a storing unit of the information processing device and a diagram illustrating the hierarchy of area IDs.

FIG. 3 is a diagram illustrating a display example of a display unit of the information processing device.

FIG. 8 is another diagram exemplifying data that is stored in the storing unit of the information processing device.

FIGS. 9A to 9C are explanatory diagrams illustrating operation examples according to a modification example of the first embodiment.

DESCRIPTION OF THE EMBODIMENTS

Each embodiment describes drag operation as a representative scroll operation. However, the present invention is not limited thereto. The present invention is applicable to a method in which a processing device that has a display unit or a similar computer performs processing of displaying an image in response to a scroll instruction that is given while a point on a screen is specified, such as a method in which a rotary operating part (wheel) of a mouse is rotated. The present invention is also not limited to a computer used in each embodiment which is an information processing device that includes a display unit and receives an input via a touch panel. For instance, the present invention can be implemented by a computer that includes a display unit and a unit for receiving information that specifies a point on the display unit and instructs to scroll an image corresponding to the specified point, or a computer that can be connected to the display unit and the information receiving unit.

Figure 16:
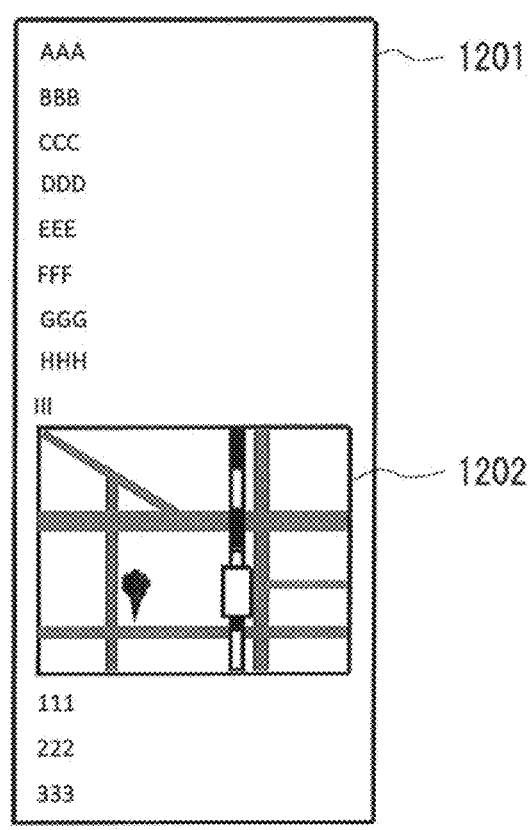
FIG. 16 is a diagram illustrating a scrollable area that contains another scrollable area.

A user is likely to experience scrolling that does not match the user's intention when, for example, dragging a point near where the map area 1202 comes into view in the operation of FIG. 16 described above. This is because the chance of failure to notice that the map area 1202 has come into view is high due to the short gap between the appearance of the map area 1202 and the accidental dragging of the map area 1202 by the user. There is another case where scrolling that does not match the user's intention tends to occur: while users usually have freedom in determining where to drag, when, for example, an information processing device that has a touch panel is held in one hand, where drag operation can be performed may be limited because operating the touch panel with the hand holding the information processing device puts restriction on the location of drag operation.

When holding and operating an information processing device concurrently with one hand, many users use all fingers except the thumb to hold the information processing device and use the thumb to operate the device's touch panel. The users at this point are inevitably touching a lower part of the touch panel. Because scroll operation causes a displayed object to move upward in most times, it is difficult for a user who is touching a lower part of a touch panel to notice an area that comes into view from the bottom of the screen. The following embodiments describe examples of solving the problems described above.

Embodiments of the present invention in the form of an information processing device that has a display screen are described in detail below with reference to the drawings. "Scroll" in the following description refers to moving what is displayed upward, downward, leftward, or rightward in order to display a part of an image that is too large to display within the screen or a given area in its entirety.

First Embodiment

A first embodiment of the present invention describes an example of a case in which, while a first area displayed on a display screen of an information processing device is being scrolled, a second area (also referred to as child area or sub-area) which can be scrolled independently of the first area (also referred to as parent area or background area) comes into view. Contents that include a second area which is a part of a first area and which can be scrolled independently of the first area are well known and can be found among conventional Web pages and the like. A detailed description on such contents is therefore omitted. When the first area is scrolled, the second area which constitutes a part of the first area is not scrolled independently and moves relatively as a part of the first area.

In the following description, an area near where the second area first appears on the display screen is referred to as scroll instruction invalidated range. The scroll instruction invalidated range can be set arbitrarily. However, in the following embodiments, a scroll instruction invalidated range 209 which is described later is established depending on the direction of scroll that is executed immediately before the range 209 is used. In other words, the range 209 is a particular range in the display unit that is determined based on an image scroll direction specified by the last scroll instruction. More specifically, the scroll instruction invalidated range 209 that is referred to after the entire screen (here, the first area) is scrolled upward is set at the bottom of the display screen. The scroll instruction invalidated range 209 that is referred to after the entire screen (here, the first area) is scrolled downward, on the other hand, is set at the top of the display screen.

Scrolling brings an image onto the display screen from the outside of the display screen, and the displayed image is then moved out of the display screen to disappear from view. Therefore, an area near where an image appears on the display screen from the outside of the display screen by the scrolling may be set as the scroll instruction invalidated range, irrespective of whether the display screen is scrolled in the top-bottom direction, left-right direction, or other directions. These settings are switched each time the direction in which the entire screen is scrolled is changed.

This embodiment describes an example in which only the first area is displayed and the second area is not displayed the first time dragging is executed. In this example, the first area is scrolled in the first dragging and an area B appears on the display screen the second time dragging is executed. In this embodiment, a touch point in the second dragging is located in the second area displayed in the scroll instruction invalidated range, so that the first area is scrolled even if the second area is dragged. It is thus determined that a user has dragged the second area when the user actually does not intend to scroll the second area independently, and the first area is scrolled as a result. In the case where the first area is not dragged by the first drag operation, the second area is scrolled when the second area is dragged.

Figure 1A:
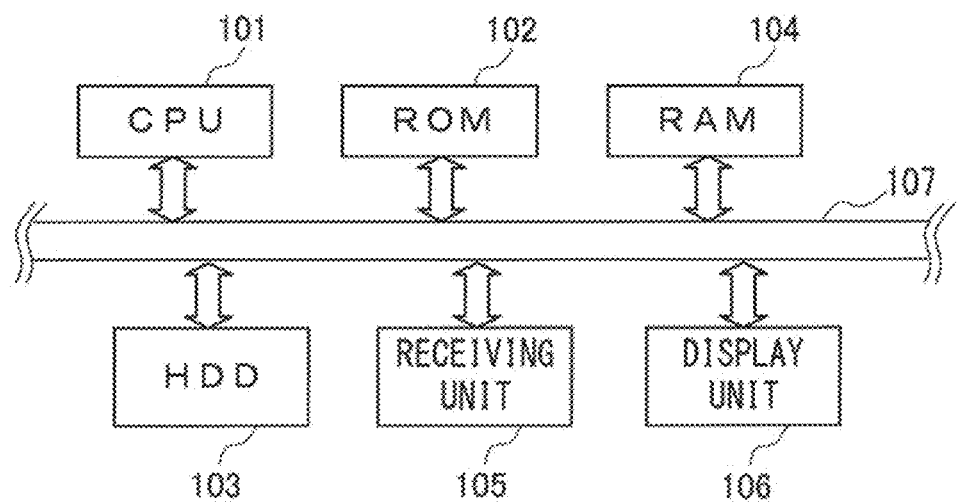
FIGS. 1A and 1B are respectively a hardware configuration diagram and function block diagram of an information processing device according to a first embodiment of the present invention.

FIG. 1A is a diagram illustrating a hardware configuration that an information processing device according to this embodiment has in order to implement the function described above. A central processing unit (CPU) 101 reads and executes control programs stored in a read only memory (ROM) 102 and a hard disk drive (HDD) 103 to control respective devices. The control programs are programs for controlling various types of operation described in this embodiment. The ROM 102 holds the control programs and various types of data used by the control programs. A random access memory (RAM) 104 includes a work area for the control programs of the CPU 101, an area to which data is evacuated during error processing, an area where the control programs are loaded, and other areas. The HDD 103 stores the various control programs and various types of data.

A receiving unit 105 is a unit for receiving information that specifies a point on a display unit, which is a unit for displaying images and the like, and that instructs to scroll an image corresponding to the specified point. The receiving unit 105 in this embodiment is a device operated by a user in order to specify a point on the display screen, such as a mouse, a touch panel, or a pen, or an interface to the device. The receiving unit 105 executes processing of receiving these types of instruction operation. In the following description, the receiving unit 105 is a touch panel and the instruction operation is performed via the operation of touching the screen (drag operation), but this embodiment is also applicable to cases where other devices such as a mouse and a pen are used.

More specifically, the instruction operation would be performed via a touch to the screen in the case of using a pen, as is the case for a finger. When a mouse is used, left-clicking the mouse with the cursor displayed on the screen, for example, would constitute the operation of touching the touch panel described above. In the case of using a different mouse, rotating a rotary operating part (wheel) installed in the mouse with the cursor displayed on the display screen, for example, would constitute the drag operation on a touch panel described above. A display unit 106 is a display screen or touch panel for displaying various types of information. The display unit 106 in the following description is a touch panel 210 which is described later with reference to FIG. 3, and doubles as the receiving unit. However, this embodiment is also applicable to cases where a device that is not a touch panel is employed.

A bus 107 transfers an address signal for specifying which component is a target of control by the CPU 101, a control signal for controlling the respective components, and data exchanged between the components. The control programs described above may be stored in the ROM 102 or the HDD 103 in advance, or may be received from an external device or the like as the need arises to be stored in the ROM 102 or the HDD 103. The CPU 101 executes various functions of the information processing device which are described later, or various operations of flow charts which are described later, by executing computer programs that are stored in the ROM 102, the HDD 103, or other places. Data stored in the RAM 104 or the HDD 103 may be stored in an external device. The CPU receives the data from the external device or the like.

Figure 1B:
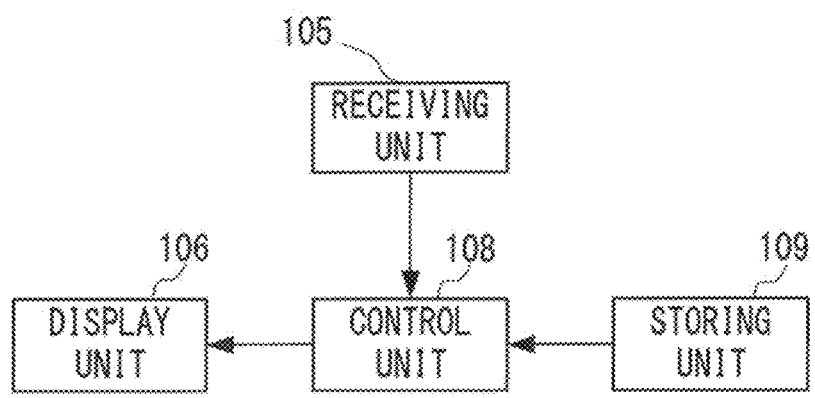

FIG. 1B is a configuration diagram of function blocks that are formed in the information processing device by executing the control programs that are stored in the ROM 102 or HDD 103 illustrated in FIG. 1A. The start of a touch, release, the movement of a touch point, and the like are detected by the receiving unit 105 and input to a control unit 108. The control unit 108 controls overall processing of the information processing device, and determines the moving speed, moving direction, and the like of a touch point via an input from the receiving unit. The control unit 108 operates also as a unit for displaying the first area, which is displayed on the display unit 106, and the second area, which is displayed in the first area. The control unit 108 also performs display control on the first area and the second area so that images displayed in the respective areas can be scrolled.

When a touched place (touch point) moves, the control unit 108 further obtains information such as which area is displayed at the location of the touch point, the scroll speed of the first area, and the display state of the first area or the second area. The control unit 108 thus operates also as a scroll executing unit for scrolling the first area or the second area. The display state of the first area or the second area refer to in what manner the area in question is being displayed, such as whether the displaying of the area is complete or incomplete, or whether the entirety of the area is being displayed on the screen. The control unit 108 operates also as a determining unit for determining, as described later, which of an image displayed in the first area, an image displayed in the second area, and an image displayed in another area is to be scrolled.

When determining this, the control unit 108 determines whether or not the user intends to continue scrolling the first area and, based on the result of the determination, determines the area to be scrolled. The determination is made based on an input from the user and a parameter for displaying an image in an area. To take the first area as an example, in the case of displaying an image location in coordinates in order to determine where on the screen an image displayed in the first area is to be displayed, the parameter is variables that constitute the coordinates. For instance, the x value and the y value are the parameter when an x-y coordinate system is used and, when polar coordinates are used, r and θ are the parameter. When images displayed in the respective areas are being scrolled, the scroll speed is included as parameters that represent the images displayed in the areas. In the following description, the image location, speed, and the like for displaying an image constitute parameters for displaying an image, unless specifically stated otherwise.

A storing unit 109 stores, in the HDD 103 or the RAM 104, information such as which area is displayed on the display unit 106 and which area is determined by the control unit 108 as a scroll target. The function of the control unit 108 and the storing unit 109 may also be implemented by a logic circuit or other types of hardware. FIG. 2A is a diagram exemplifying data that is stored in the storing unit 109. The storing unit 109 in this embodiment stores an area 201, a scroll time 202, a scroll target area 203, a maximum operation interval 208, and the scroll instruction invalidated range 209.

The area 201 indicates an area for displaying what is displayed on the display unit 106. What is displayed includes, specifically, text and a drawing object such as an image, or, in the case where the area 201 includes an area with which the area 201 forms a parent-child relation described later, a child area. These text, images, and the like that are displayed are simply referred to as "image" in the following description in order to simplify the description. An image displayed in the area 201 scrolls in relation to the movement of a touch point. "Scroll" means moving an image displayed in a display range 205 in relation to the amount and direction of the movement of a touch point. Information of the area 201 includes an area ID 204 and the display range 205. The area ID 204 is a letter string for identifying the area 201. An area that has "ID_bg" as the area ID 204 is a background area, and a sub-area that has "ID_map" as the area ID 204 is a map area. The display range 205 is a range in which an image displayed in the area 201 is displayed out of the range of display of the display unit 106.

The scroll time 202 indicates a time at which scroll is started. The scroll time 202 in this example indicates that scroll has started at 12:00 on Jan. 1, 2012. The scroll target area 203 indicates an area in which an image being scrolled is displayed, or, when no image is being scrolled, an area in which the last scrolled image has been displayed. The scroll target area 203 in FIG. 2A indicates that an image displayed in a background area that is identified by ID_bg has been scrolled last.

The maximum operation interval 208 is a threshold for the differential between the start time of the current touch point for scrolling an image that is displayed in the last touched area (the area where drag operation is started last time) and the last start time. The scroll instruction invalidated range 209 is a reference range for determining whether to invalidate scroll operation of a touched area. A concrete method of referring to the range 209 is described later. The scroll instruction invalidated range 209 is, as described above, updated as necessary based on a direction in which the first area is scrolled as instructed by the last scroll instruction.

FIG. 2B is a diagram illustrating that the area 201 forms a parent-child relation. In this embodiment, two areas 201 are stored in the storing unit 109. Of the two, the area that has "ID_bg" as the area ID 204 is the parent area of an area that has "ID_map" as the area ID 204. Hereinafter, the area of which the area ID 204 is "ID_bg" is referred to as background area 206 and the sub-area of which the area ID 204 is "ID_map" is referred to as map area 207. The background area 206 is accordingly the first area in which a scrollable first image is displayed, and the map area 207 is the second area for displaying a second image which is displayed within the background area 206 constituting the first area and which can be scrolled independently of the background area 206.

FIG. 3 is an explanatory diagram of the schematic configuration of the information processing device according to this embodiment which is denoted by 200. In FIG. 3, the background area 206, map area 207, and scroll instruction invalidated range 209 described with reference to FIG. 2A are all displayed on the touch panel 210 of the information processing device 200 which serves as the display unit 106 illustrated in FIG. 1B. The display range 205 of the background area 206 which is the parent area is equal to the range of display of the display unit 106 at this point. The display range 205 of the map area 207 constitutes a part of the range of display of the display unit 106. When an image displayed in the background area 206 is scrolled, an image displayed in the map area 207 moves as well. The image displayed in the map area 207 does not scroll independently of the background area 206 in this case. As a result, the image displayed in the map area 207 changes, for example, as illustrated in FIGS. 7A to 7D. The scroll instruction invalidated range 209 is a reference area that is used to make a decision inside the information processing device, and is not necessarily displayed on the display unit 106. In the case where displaying the range 209 on the display unit 106 is chosen, the location of the range 209 switches to the bottom or top of the screen each time the scroll direction of the background area 206 which is the parent area changes.

Figure 4:
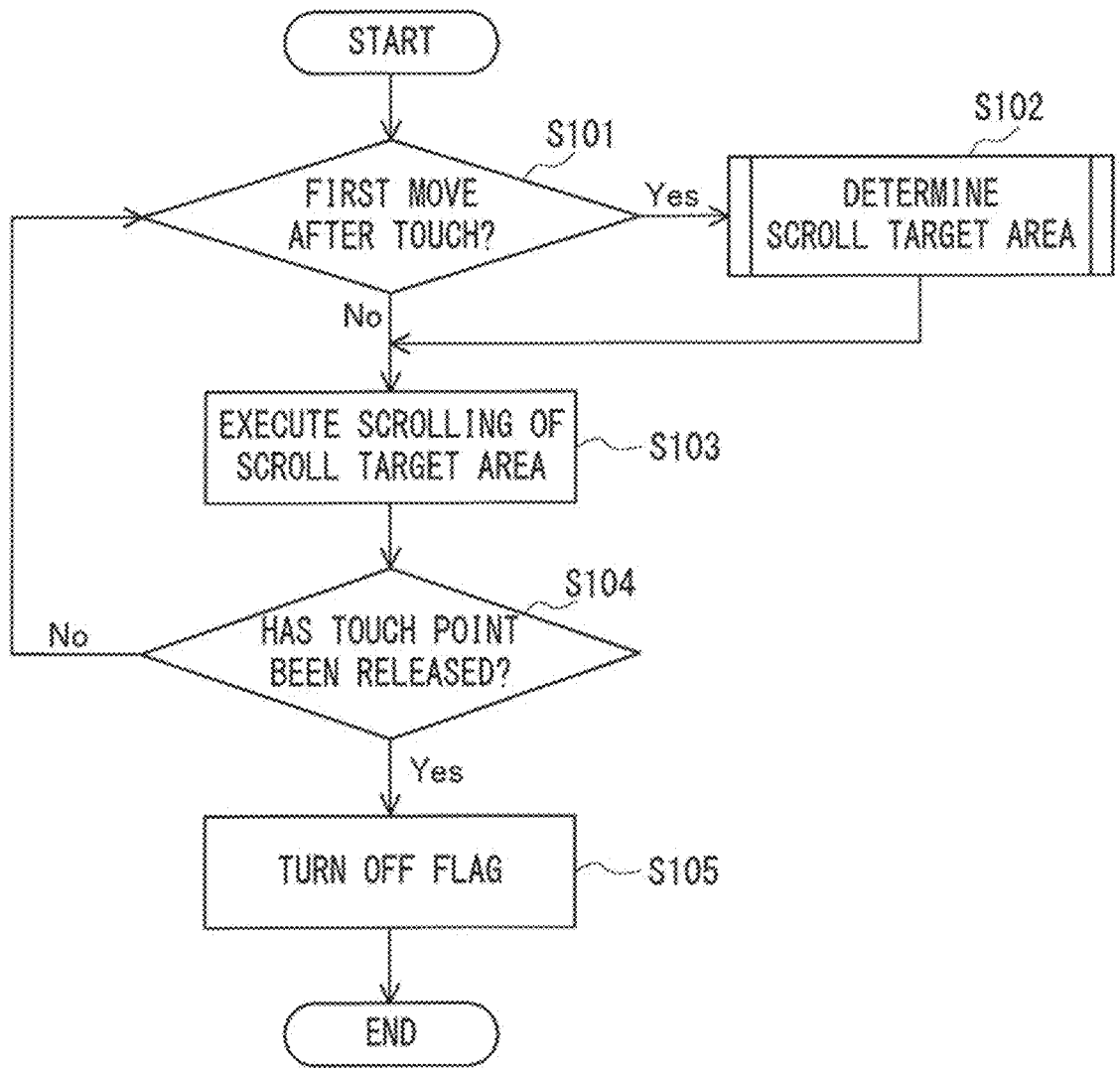
FIG. 4 is a flow chart of processing that is executed when the information processing device detects the movement of a touch point.

FIG. 4 is a flow chart illustrating processing that is executed when the receiving unit 105 detects the user's drag operation (operation for issuing a scroll instruction). "Drag operation" in each embodiment refers to a series of operation steps that includes starting specifying (touching) a point on the screen with the use of a touch panel or a pointing device such as a mouse, and subsequently moving the point while keeping specifying the point. Here, the first touch point is the start point of dragging, and in which area the drag start point is located matters, too. The following description is based on the premise that the receiving unit 105 recognizes the user's drag operation as the movement of a touch point on the touch panel. Each step is executed by the control unit 108 unless specifically stated otherwise.

When the receiving unit 105 detects the movement of a touch point, the control unit 108 determines whether or not this is the first time the touch point is moved after the initial touch (S101). This determination involves detecting a flag that is stored in the storing unit 109 to determine that it is the first move in the case where the flag is "off", and to determine that it is not the first move in the case where the flag is "on".

When it is determined that the touch point has been moved for the first time (S101: Y), the control unit 108 turns on the flag stored in the storing unit 109, and proceeds to Step S102 to determine an area in which an image to be scrolled is displayed. Details of this determination are described later with reference to flow charts of FIGS. 5 and 6. Thereafter, the control unit 108 scrolls the image displayed in the scroll target area 203 (S103). In the case where the flag stored in the storing unit 109 is "on" when the movement of the touch point is detected by the receiving unit 105, on the other hand, the control unit 108 determines that the detected movement is not the first move (S101: N). Then the control unit 108 scrolls an image displayed in the scroll target area 203 of the last movement of the touch point (S103).

In the case where the detected movement is not the first move, the display unit 106 does not execute the processing of determining the scroll target area (S102). Instead, an area that has been scrolled in the preceding movement is set as the scroll target area, and an image displayed in this scroll target area is scrolled (S103). Thereafter, the control unit 108 determines whether or not the receiving unit has detected the release of the touch point (S104), and returns to S101 in the case where the release has not been detected (S104: N). In the case where the release has been detected (S104: Y), on the other hand, the flag is turned off (S105) and the processing is ended.

Figure 5:
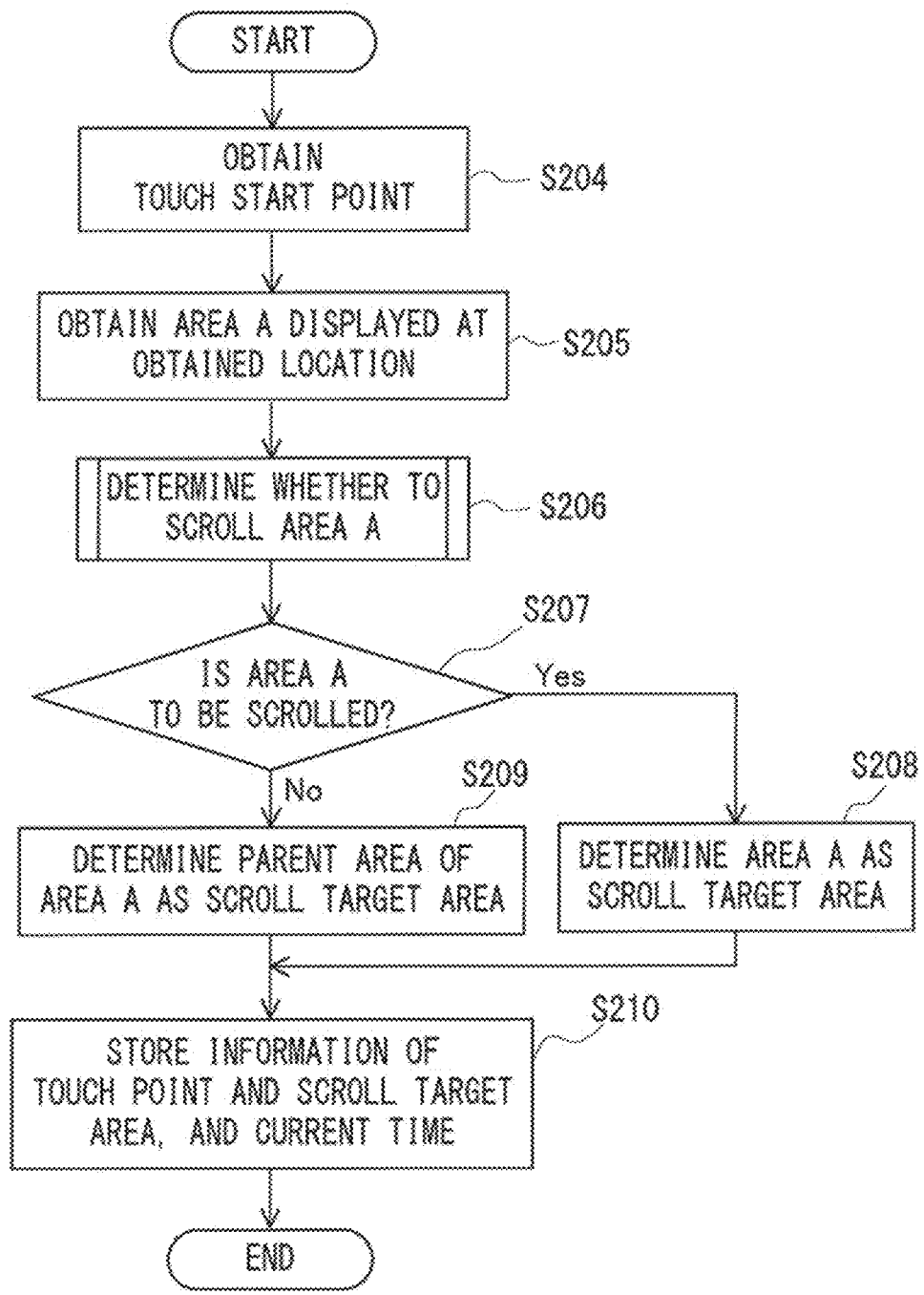
FIG. 5 is a flow chart illustrating processing that is executed when the information processing device determines whether a user is aware of a certain area.

FIG. 5 illustrates a specific flow of the processing of determining the scroll target area 203 in S102 of FIG. 4. In FIG. 5, the control unit 108 obtains a touch start point (corresponds to the drag operation start point described above) based on the touch point (S204). Thereafter, the control unit 108 obtains an area that is displayed at the start point obtained in S204, and sets this area as an area A (S205).

A concrete example is given on steps of obtaining the area A. The control unit 108 first refers to the parent-child relation of the areas 201 and obtains an area that is at the low end of the hierarchy. The control unit 108 determines whether or not the display range 205 of the area at the low end contains the touch start point obtained in S204 of FIG. 5. In the case where the start point is contained, the obtained area is set as the area A. In the case where the start point is not contained, the same processing is performed on other areas that are at the low end of the hierarchy. In the case where none of the areas at the low end contains the touch start point, the parent area is set as the area A.

After obtaining the area A in the manner described above, the control unit 108 determines in FIG. 5 whether to scroll an image displayed in the area A or not (S206). In the case where the area A itself is the parent area, an image displayed in the area A is immediately scrolled in S207, which is described later. In the case where the area A is a child to a parent area, on the other hand, the control unit 108 determines whether or not to scroll an image that is displayed in the area A independently of the parent area in S207, which is described later. The basis of the determination should be an objective indicator of whether the user is aware of the area A or not, but the type of the indicator can be selected arbitrarily and the basis can be adjusted as seen fit. An example of this determination basis is described later. Based on the result of this determination, the control unit 108 determines whether or not to scroll the image displayed in the area A (S207).

When it is determined that the image displayed in the area A is to be scrolled (S207: Y), the control unit 108 determines the image displayed in the area A as a scroll target area (S208). The storing unit 109 then stores the area A obtained in S205 as the scroll target area 203. When there is no area that is the parent to the area A as described above, the area A itself is the parent area and the control unit 108 therefore determines that the area A is to be scrolled immediately. When the area A is a child to a parent area, on the other hand, the area A corresponds to a sub-area, and the control unit 108 determines whether the area A is to be scrolled independently of the parent area or not.

When it is determined that the user is likely to be unaware of the fact that the area A is a sub-area and not a parent area, the control unit 108 decides against scrolling the image displayed in the area A (S207: N), and determines an area that is the parent to the area A as a scroll target area (S209). The storing unit 109 then stores the parent area of the area obtained in S205 as the scroll target area 203. The control unit 108 stores information of the touch point and the scroll time 202, and stores the time of detection of a touch to an area on the screen where scroll is started (current time) as the last scroll time 202 in the storing unit 109 (S210). The control unit 108 then ends this processing. The processing of S102 in FIG. 4 is thus completed through the processing of S204 to S210 in FIG. 5. The processing then proceeds to S103 of FIG. 4, and S104 and S105 are executed in the manner described above.

Figure 6:
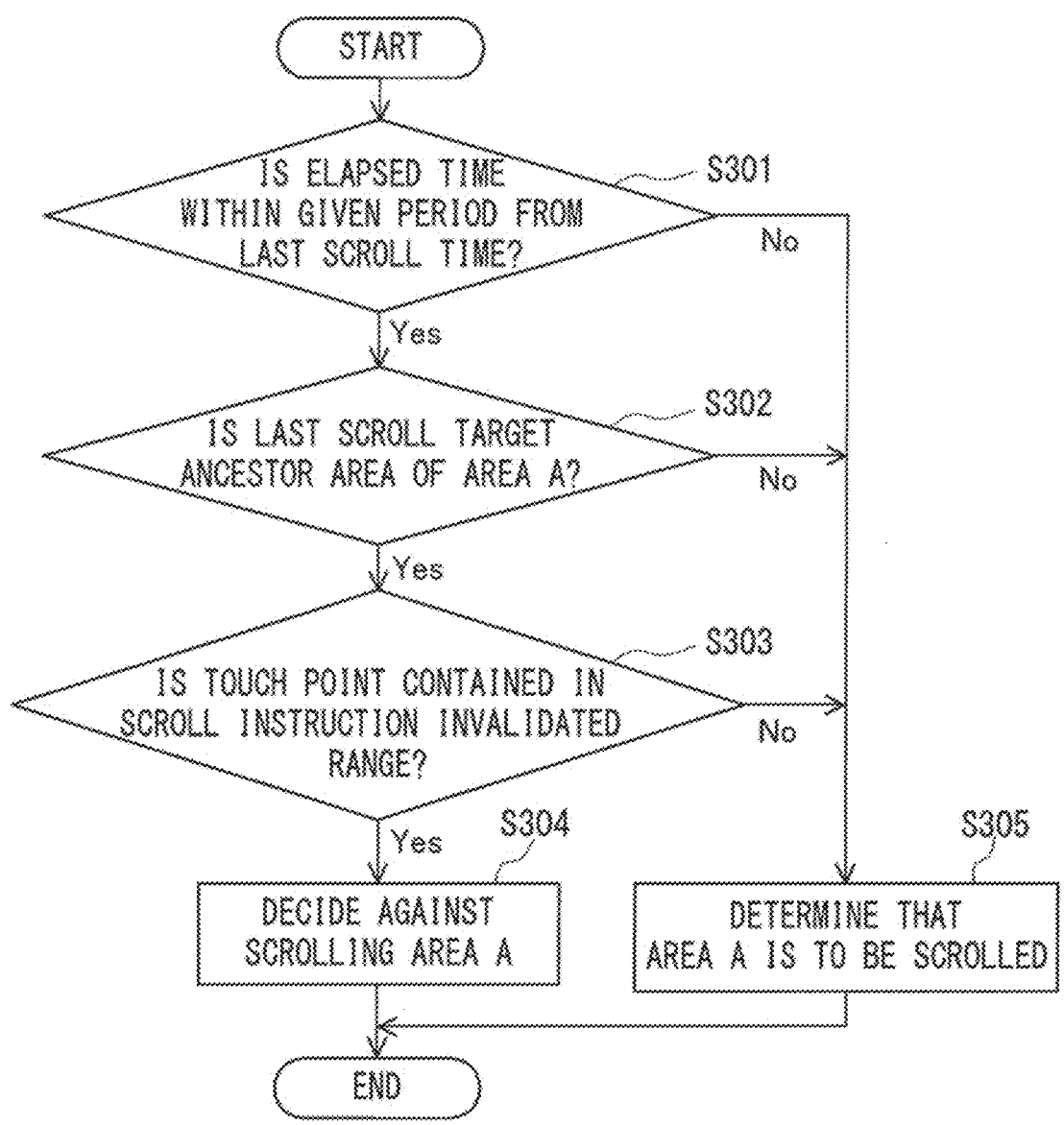
FIG. 6 is a flow chart outlining processing that is executed in the first embodiment.

FIG. 6 illustrates a concrete example of the processing procedure of S206 in FIG. 5, namely, processing of determining whether or not the user is aware of the area A. The precision of determination on whether to scroll an image displayed in the area A or not can be improved both by executing one of Steps S301, S302, and S303 in FIG. 6 alone, and by executing Steps S301 to S303 in a different order. In this embodiment, S301, S302, and S303 are executed in combination in the order stated so that the precision of the determination is enhanced even more. In FIG. 6, the control unit 108 compares the last scroll (start) time 202 and the current scroll (start) time to determine whether or not the elapsed time is within a given period of time, i.e., 500 ms which is shown as the maximum operation interval 208 in FIG. 2A (S301). In the case where the elapsed time exceeds the given period, or in the case where the last scroll time 202 has not been stored, the control unit 108 determines that the user is not aware of the area 201 obtained in S205 (S301: N), and determines the area A as a scroll target area (S305).

In the case where the elapsed time is shorter than 500 ms (S301: Y), the control unit 108 compares the scroll target area 203 and the area 201 obtained in S205 (S302). When the comparison shows the parent-child relation of the area 201 is such that the scroll target area 203 is not an ancestor of the area 201, in other words, when the scroll target area 203 is not the parent of the area 201 nor a parent two or more generations removed from the area 201 (S302: N), the area A is determined as a scroll target area (S305). In the case where the scroll target area 203 is an ancestor of the area 201, the control unit 108 determines whether or not the first touch point is contained in the scroll instruction invalidated range 209 (S303). When the range 209 does not contain the first touch point (S303: N), the area A is determined as a scroll target area (S305). After S305, the control unit 108 determines that the user is aware of the area 201 obtained in S205, and ends this processing.

In the case where the first touch point is contained in the scroll instruction invalidated range 209 (S303: Y), on the other hand, the control unit 108 determines that the user is unaware of the area 201 obtained in S205 (S304), and ends this processing. Consequently, the area A that is a sub-area is not scrolled in S304 and, instead, the entire parent area scrolls in S209 described above. In other words, the scrolling of the parent area continues.

As described, an image displayed in the first area can be scrolled when the second area is dragged in the second drag operation, too, if given conditions such as the scroll instruction invalidated range 209 containing the touch point (S303) are satisfied.

Examples of scroll operation according to this embodiment are described next. In these examples, the area 201, the maximum operation interval 208, and the scroll instruction invalidated range 209 take values written in FIG. 2. The value of the maximum operation interval 208 is therefore 500 ms in this embodiment.

Operation Example A

Figure 7A:
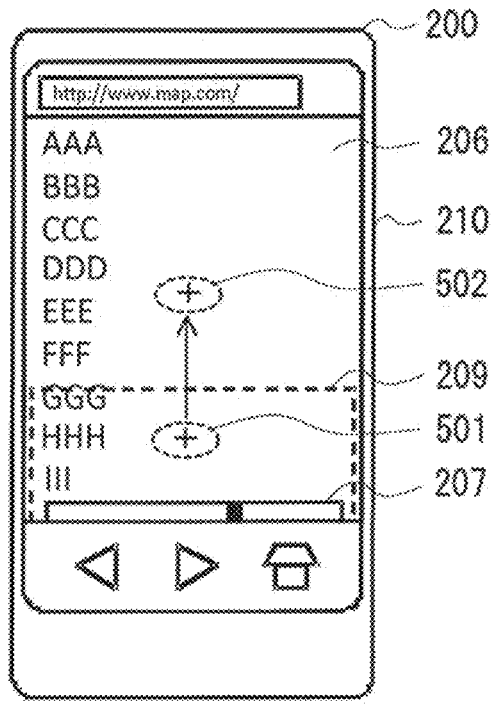
FIGS. 7A to 7D are explanatory diagrams illustrating screen operation examples.
Figure 7B:
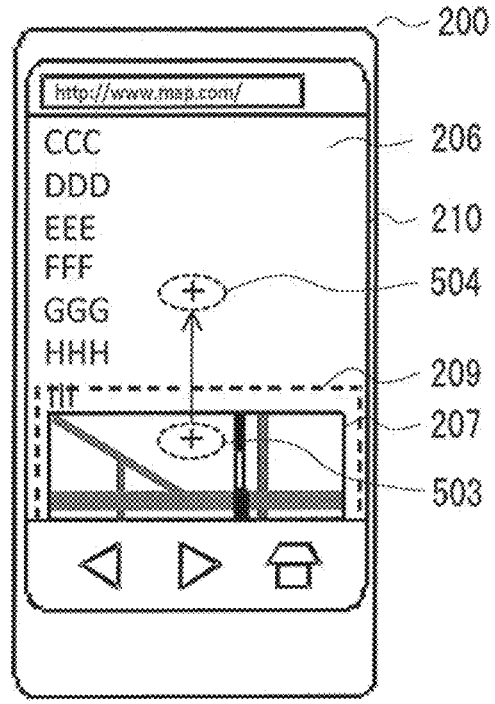

Operation Example A is an example of the simplest operation in which the user scrolls an image displayed in the background area 206 in the first dragging and, after a short time, performs dragging for the second time. How the screen of the touch panel 210 looks when the first dragging is started in Operation Example A is illustrated in FIG. 7A. FIG. 7B illustrates how the screen of the touch panel 210 looks when the second dragging is started.

The user in this example drags an image displayed in the background area 206 of FIG. 7A when performing drag operation for the first time and, in drag operation performed for the second time, touches and drags an image displayed in the map area 207, which has appeared in the scroll instruction invalidated range as a result of the first drag operation. In the second dragging, which of the background area 206 of FIG. 7B and the map area 207, which is a sub-area, is to be scrolled is determined. Details thereof are described below.

In Operation Example A, a point 501 in the background area 206 of FIG. 7A is touched first and dragged upward toward a point 502 as the first drag operation. The image displayed in the background area 206 is consequently scrolled by processing described later. An image to be displayed in the map area 207 is displayed on the touch panel 210 as a result. The map area 207 in this example is contained in the scroll instruction invalidated range 209. Immediately thereafter, the user drags upward from a point 503, which is located in the map area 207, toward a point 504 as the second drag operation as illustrated in FIG. 7B. The interval between the first drag operation and the second drag operation here is 200 ms, which is shorter than the value of the maximum operation interval 208, 1,000 ms. The control unit 108 in this case determines, by processing described later, that the user is unaware of the map area 207, and continues the scrolling of the background area 206.

The processing executed by the control unit 108 in the first drag operation is described next through the steps illustrated in FIGS. 4 to 6. The processing of FIG. 4 is executed first when the user touches the point 501 of FIG. 7A, which illustrates the screen of the touch panel 210, and moves the touching finger for the first time. The control unit 108 determines that this movement of the touch point is the first move (S101), and determines the scroll target area (S102).

Referring to FIG. 5, which is a diagram illustrating details of S102, the control unit 108 obtains the touch start point (S204) and obtains the area A displayed at the obtained location (S205). In this example, where the point 501 of FIG. 7A is in the background area 206, the background area 206 is obtained as the area A in S205.

Whether to set the background area 206 as a scroll target or not is determined next (S206).

As illustrated in FIG. 6, which details S206 of FIG. 5, the control unit 108 determines whether or not the time of the touch is within a given period from the last scroll time (S301). In this example, where the touching finger is moved for the first time and the last scroll time is not stored, it is determined that the time of the touch is outside the given period (S301: N). The control unit 108 determines that the user is aware of the area A obtained in S205, namely, the background area 206, and decides to scroll an image displayed in the area A (S305).

Returning to FIG. 5, the control unit 108 consequently determines in S206 that an image displayed in the area A is to be scrolled, and determines in S207 that an image displayed in the background area 206 which is the area A is to be scrolled (S207: Y). The control unit 108 next determines the background area 206 as a scroll target area (S208), stores the current time as the last scroll time, and also stores information of the touch point and the scroll target area in the storing unit 109 (S210). The processing in the control unit 108 then returns to FIG. 4 in order to scroll an image displayed in the background area 206, which has been determined as a scroll target area (S103). Thereafter, whether the touch point has been released or not is determined (S104).

It is determined that the touch point is not released until the user moves the finger to the point 502 and releases the touch point (S104: N), and the processing moves to S101. In this case, it is determined in S101 that the movement is not the first move after the touch (S101: N), the background area 206 determined as a scroll target area is scrolled (S103), and whether or not the touch point has been released is determined again (S104). In this manner, S101, S103, and S104 of FIG. 4 are executed sequentially and repeatedly until the touch point is released. When the touch point is released (S104: Y), the processing is ended.

Described next is processing that is executed when the second drag operation is performed after a given period of time has elapsed since the first drag operation. When the user touches the point 503 of FIG. 7B and moves the touching finger for the first time, the processing of FIG. 4 is executed. The control unit 108 determines that this touch point movement is the first move in the second drag operation (S101), and determines a scroll target area (S102).

Referring to FIG. 5, which is a diagram illustrating details of S102 of FIG. 4, the control unit 108 obtains the touch start point (S204) and obtains the area A displayed at the obtained location (S205). In this example, where the point 503 of FIG. 7B is in the map area, the area A is the map area 207. Whether to set an image displayed in the area A, namely, the map area 207, as a scroll target or not is determined next (S206). As illustrated in FIG. 6, which details S206 of FIG. 5, the control unit 108 determines whether or not the time of the touch is within a given period from the last scroll time (S301). In this example, the time elapsed since the last scroll time is 200 ms, which is less than the value set as the maximum operation interval threshold, 500 ms, and it is determined that the time of the touch is within the given period (S301: Y).

Thereafter, whether or not the last scroll target is an area that is an ancestor to the map area 207 is determined (S302). The last scroll target here is the background area 206 which is an ancestor to the map area 207 (S302: Y), and the control unit 108 accordingly proceeds to S303. The control unit 108 determines whether or not the touch point 503 is contained in the scroll instruction invalidated range 209 (S303). In this example, where the touch point 503 is contained in the scroll instruction invalidated range 209 (S303: Y), the control unit 108 proceeds to S304 and determines that the user is unaware of the map area 207. The control unit 108 then decides against scrolling an image that is displayed in the area A (S304).

From the result of the determination in S304 of FIG. 6, it is determined in S206 of FIG. 5 that an image displayed in the area A is not to be scrolled. The control unit 108 accordingly decides against scrolling an image that is displayed in the area A in S207 of FIG. 5 (S207: N), and determines the area that is the parent to the area A as a scroll target area (S209). In this example, the area A is the map area 207 and the scroll target area is the background area 206, which is the parent area of the map area 207 and which is the last scroll target with respect to the map area. The control unit 108 stores the current time as the last scroll time, and also stores information of the touch point and the scroll target area, as well as the current time (S210).

The processing in the control unit next returns to FIG. 4 in order to scroll an image displayed in the background area 206, which has been determined as a scroll target area (S103). Thereafter, whether the touch point has been released or not is determined (S104). As described above, S101, S103, and S104 of FIG. 4 are then executed sequentially and repeatedly until the touch point is released. When the touch point is released, the processing is ended.

Operation Example B

The user's operation procedure in Operation Example B is mostly the same as in Operation Example A and, similarly to Operation Example A, the screen of the touch panel 210 looks as illustrated in FIGS. 7A and 7B when the first dragging is started and when the second dragging is started. Operation Example B, however, differs from Operation Example A in that the interval between the time when the first dragging is performed and the time when the second dragging is performed is longer than 500 ms, which is the value of the maximum operation interval 208. The control unit 108 therefore determines that the user has noticed the map area 207. The map area 207, instead of the background area 206, is consequently scrolled in the second dragging unlike Operation Example A. Details thereof are described below.

First, an image displayed in the background area 206 is scrolled by processing that is executed in the first drag operation. This processing is the same as the one executed in the first drag operation in Operation Example A, and its description is omitted here. Processing that is executed in the second drag operation is described next. When the user touches the point 503 of FIG. 7B with a finger and starts dragging for the second time, the processing of FIG. 4 is executed.

In FIG. 4, the control unit 108 determines that this touch point movement is the first move, i.e., the first move in the second dragging (S101), and determines a scroll target area (S102). In S102, the control unit 108 obtains the touch start point (S204) as illustrated in FIG. 5, which illustrates details thereof, and obtains the area A which is an area displayed at the obtained start point. In this example, the map area 207 located at the touch start point is determined as the area A. Whether to scroll an image displayed in the area A or not is determined next (S206).

As illustrated in FIG. 6, which details the determination in S206, the control unit 108 determines whether or not the time of the touch is within a given period from the last scroll time (S301). In this example, 1,000 ms has elapsed since the first drag operation, which is more than the value of the maximum operation interval 208, 500 ms, as mentioned above. It is therefore determined that the time of the touch is outside the given period (S301: N). The control unit 108 accordingly determines that the user is aware of the area A located at the touch start point in the second dragging, in this example, the map area 207, and decides to scroll an image displayed in the area A (S305).

Returning to FIG. 5, the control unit 108 consequently determines in S206 that an image displayed in the area A is to be scrolled, and decides in S207 to scroll an image displayed in the area A which is the map area 207 (S207: Y). Consequently, the map area 207 is determined as a scroll target area (S208), information of the touch point and the scroll target area is recorded, and the scroll time is stored (S210). The map area 207 is stored as the scroll target area 203 in this example.

After S210, the processing returns to FIG. 4 and the control unit 108 scrolls an image displayed in the map area 207, which has been determined as a scroll target area (S103). The control unit 108 further executes S104 and S105 in the manner described above, and the processing of scrolling an image that is displayed in the map area 207 (S103) is executed repeatedly until the user moves the finger to the point 504. As in Operation Example A, S101, S103, and S104 of FIG. 4 are executed sequentially and repeatedly until the user moves the finger to the point 504 and releases the touch point. When the touch point is released, the processing is ended.

Operation Example C

Figure 7C:
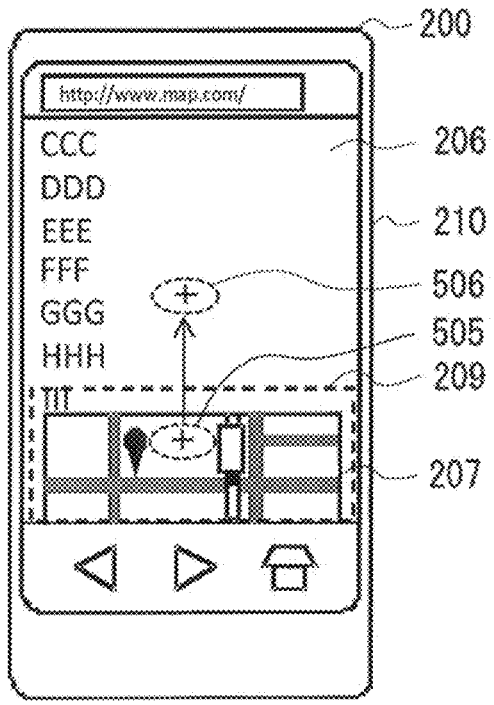

In Operation Example C, the map area 207 which is a child area of the background area 206 is displayed on the screen of the touch panel 210 along with the background area 206 from the start. The map area 207 is also contained in the scroll instruction invalidated range 209. The screen of the touch panel 210 looks as illustrated in FIG. 7B when dragging is performed for the first time in Operation Example C. FIG. 7C illustrates how the screen of the touch panel 210 looks when dragging is performed for the second time in Operation Example C. The interval between the first dragging and the second dragging here is 200 ms, which is less than the value of the maximum operation interval 208.

The user touches the point 503, which is contained in the map area 207 of FIG. 7B, and drags the display range 205 of FIG. 2 for the first time. After releasing the touch point, the user touches the same point in the display range 205 in a short time and drags the display range 205 for the second time. In the second dragging in this case, a point 505 which is contained in the map area 207 of FIG. 7C is touched. It is determined that the user is aware of the map area 207 at the time the second dragging is performed, based on the fact that the background area 206 which is the parent area of the map area 207 has not been scrolled in the preceding operation. The control unit 108 accordingly scrolls an image displayed in the map area 207 in the second drag operation. Details thereof are described below.

Processing that is executed in the first drag operation is described first. When the user touches the point 503 of FIG. 7B and moves the touching finger for the first time, the processing of FIG. 4 is executed first. The control unit 108 determines that this touch point movement is the first move (S101) and determines a scroll target area (S102). Referring to FIG. 5, which is a diagram illustrating details of S102, the control unit 108 obtains the touch start point (S240) and obtains the area A displayed at the obtained location (S205). In this example, where the touch point 503 of FIG. 7B is in the map area 207, the map area 207 is obtained as the area A in S205.

Whether to set the background area 206 as a scroll target or not is determined next (S206). As illustrated in FIG. 6, which details S206 of FIG. 5, the control unit 108 determines whether or not the time of the touch is within a given period from the last scroll time (S301). In this example, where the touching finger is moved for the first time and the last scroll time is therefore not stored, the time of the touch is outside the given period (S301: N). The control unit 108 accordingly determines that the user is aware of the area A obtained in S205, namely, the map area 207, and decides to scroll an image displayed in the area A (S205). Returning to FIG. 5, the control unit 108 consequently determines in S206 that an image displayed in the area A is to be scrolled, and decides in S207 to scroll the map area 207 which is the area A (S207: Y). The map area 207 is determined as a scroll target area (S208), information of the touch point and the scroll target area is recorded, and the scroll time is stored (S210).

The processing in the control unit 108 next returns to FIG. 4 in order to scroll an image displayed in the map area 207, which has been determined as the scroll target area (S103). Thereafter, whether the touch point has been released or not is determined (S104). As in Operation Example A described above, S101, S103, and S104 of FIG. 4 are then executed sequentially and repeatedly until the touch point is released. When the touch point is released, the processing is ended.

Next, processing that is executed in the second drag operation is described first. When the user touches the point 505 of FIG. 7C and moves the touching finger for the first time, the processing of FIG. 4 is executed first. The control unit 108 determines that this touch point movement is the first move (S101) and determines a scroll target area (S102). Referring to FIG. 5, which is a diagram illustrating details of S102, the control unit 108 obtains the touch start point (S240) and obtains the area A displayed at the obtained location (S205). In this example, where the touch point 505 of FIG. 7C is in the map area 207, the map area 207 is obtained as the area A in S205.

Whether to set the background area 206 as a scroll target or not is determined next (S206). As illustrated in FIG. 6, which details the determination of S206, the control unit 108 determines whether or not the time of the touch is within a given period from the last scroll time (S301). In this example, the time elapsed since the last scroll time is 200 ms, which is less than the set value of the maximum operation interval, 500 ms. The control unit 108 therefore determines that the time of the touch is within the given period (S301: Y), and proceeds to S302. The control unit 108 also determines whether or not the last scroll target is an area that is an ancestor to the map area 207 (S302). The last scroll target is the map area 207 itself (S302: N), and the processing by the control unit 108 accordingly proceeds to S305, where it is determined that an image displayed in the area A is to be scrolled.

Returning to FIG. 5, the control unit 108 therefore determines in S206 that an image displayed in the area A is to be scrolled, decides in S207 of FIG. 5 to scroll an image displayed in the area A (S207: Y), and determines the area A as a scroll target area (S208). The area A in this example is the map area 207. The control unit 108 also stores the current time as the last scroll time, and stores information of the touch point and the scroll target area in the storing unit 109 (S210).

The processing in the control unit next returns to FIG. 4 in order to scroll an image displayed in the map area 207, which has been determined as the scroll target area (S103). Thereafter, whether the touch point has been released or not is determined (S104). As in the operation examples described above, S101, S103, and S104 of FIG. 4 are then executed sequentially and repeatedly until the touch point is released. When the touch point is released, the processing is ended.

Operation Example D

Figure 7D:
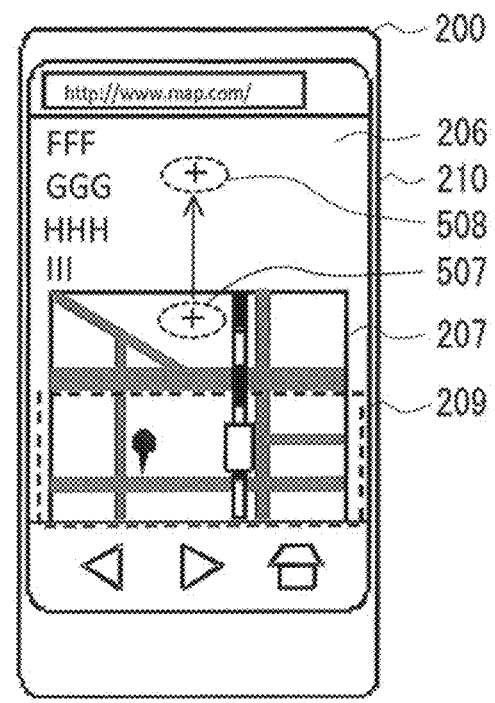

What is displayed on the touch panel 210 when dragging is performed for the first time in Operation Example D is illustrated in FIG. 7A. FIG. 7D illustrates what is displayed on the touch panel 210 when dragging is performed for the second time in Operation Example D.

In Operation Example D, the user first touches the point 501 in the background area 206 of FIG. 7A first and drags for the first time. The background area 206 is scrolled in this case as in Operation Example A. Operation Example D differs from Operation Example A in that, after the first scroll, the map area 207 is displayed in a location that stretches beyond the scroll instruction invalidated range 209 as illustrated in FIG. 7D. The user next touches a point 507 which is contained in the map area 207 in FIG. 7D, and drags for the second time. The interval between the first dragging and the second dragging here is 200 ms, which is less than the value of the maximum operation interval 208. The control unit 108 in Operation Example D scrolls the background area 206 in the first drag operation, and scrolls the map area 207 in the second drag operation. Details of the processing in Operation Example D are described below.

The background area 206 is scrolled first in processing that is executed when the user performs the first drag operation. This processing is the same as the one that is executed in the first drag operation in Operation Example A, and its description is omitted here. Processing that is executed in the second drag operation is described next. The processing of FIG. 4 is executed first when the user touches the point 507 in the map area 207 of FIG. 7D and moves the touching finger for the first time. The control unit 108 determines that this touch point movement is the first move (S101) and determines a scroll target area (S102). Referring to FIG. 5, which is a diagram illustrating details of S102, the control unit 108 obtains the touch start point (S240) and obtains the area A displayed at the obtained location (S205). In this example, where the point 507 of FIG. 7D is in the map area 207, the map area 207 is obtained as the area A in S205.

Whether to set an image displayed in the area A as a scroll target or not is determined next (S206). As illustrated in FIG. 6, which details S206 of FIG. 5, the control unit 108 determines whether or not the time of the touch is within a given period from the last scroll time (S301). In this example, the time elapsed since the last scroll time is 200 ms, which is less than the set value of the maximum operation interval, 500 ms. The control unit 108 therefore determines that the time of the touch is within the given period (S301: Y). The control unit 108 then determines whether or not the last scroll target is an area that is an ancestor to the map area 207 (S302). The last scroll target is the background area 206 which is an ancestor to the map area 207 (S302: Y), and the control unit 108 accordingly proceeds to S303. The control unit 108 determines whether or not the touch point 507 is contained in the scroll instruction invalidated range 209 (S303). In this example, where the touch point 507 is not contained in the scroll instruction invalidated range 209 (S303: N), the control unit 108 determines that the user is aware of the map area 207, and scrolls an image displayed in the area A (S305).

From the result of the determination in S305 of FIG. 6, it is determined in S206 of FIG. 5 that an image displayed in the area A is to be scrolled. The control unit 108 accordingly decides in S207 of FIG. 5 to scroll an image displayed in the area A (S207: Y), and determines the map area 207 which is the area A as a scroll target area (S208). The control unit 108 also stores the current time as the last scroll time, and stores information of the touch point and the scroll target area in the storing unit 109 (S210). The processing in the control unit then returns to FIG. 4 in order to scroll an image displayed in the map area 207, which has been determined as a scroll target area (S103). Thereafter, whether or not the touch point has been released is determined (S104). S101, S103, and S104 of FIG. 4 are executed sequentially and repeatedly until the touch point is released in the manner described above. The processing is ended when the touch point is released.

In this embodiment, when a user who is unaware of the map area 207 drags the map area 207 by mistake, too, an image displayed in the background area 206 which is the parent to the map area 207 is scrolled as shown in Operation Example A. This embodiment also determines whether or not the user is aware of the area A, which is the first touched area, by using conditions given below.

1) Whether the first touch point is contained in the scroll instruction invalidated range 209 (S303: Operation Examples A and D)

2) Whether the maximum operation interval 208 has elapsed since the last scroll operation (S301: Operation Example B)

3) Whether the area A which contains the first touch point has been scrolled the last time (S302: Operation Example C)

The result of the determination is used to determine whether to scroll an image displayed in the area A or not. Specifically, an image displayed in the area A is scrolled when the user is aware of the area A, and is not scrolled when the user is unaware of the area A.

Modification Example

There are various modification examples for the processing described in the first embodiment with reference to S206 of FIG. 5 and FIG. 6, which illustrates details of S206, specifically, processing of determining whether or not the user is aware of the area A which contains the first touch point. This determination processing may use other methods as long as whether or not the user has touched the area A which is a sub-area with the intention of scrolling the area A can be determined. One of the various modification examples is described below.

FIG. 8 is a diagram exemplifying data that is stored in the storing unit 109 when a method according to the modification example is conducted. The storing unit 109 in this example stores, in addition to the area 201 and other types of data illustrated in FIG. 2A, a scroll speed threshold 704, a distance threshold 705, a moving speed threshold 706, a moving direction threshold 707, a touch start point 708, a touch point moving speed 709, and a touch point moving direction 710.

In FIG. 8, the distance threshold 705 is 20 pixels, the moving speed threshold 706 is 20 pixels/s, and an angle set as the moving direction threshold is 60°. For the touch start point 708, the touch point moving speed 709, and the touch point moving direction 710, values updated through detection which is executed as the need arises are recorded, and no specific values are shown in FIG. 8. Details of the distance threshold and others are described later. The area 201 and other types of data illustrated in FIG. 2A are common to FIG. 2 and FIG. 8, and descriptions thereof are omitted here.

Described below is a method of determining whether to scroll an image displayed in the area A or not in the modification example. In the modification example, the first dragging starts with the screen in the state illustrated in FIG. 7A. Processing executed in the first drag operation is the same as in Operation Example A. However, the start point, speed, and direction of the second drag operation subsequently performed vary from one operation example described later to another. FIGS. 9A to 9C illustrate the respective states that the screen is in when the user touches the touch panel 210 and drags in the second dragging in the operation examples of the modification example. In the following example, whether the entirety of an image is being displayed on the screen is determined from the location of the displayed image, and it is determined that displaying the image has been completed in the case where the entire image is being displayed. Details thereof are described later in the operation examples.

Figure 10:
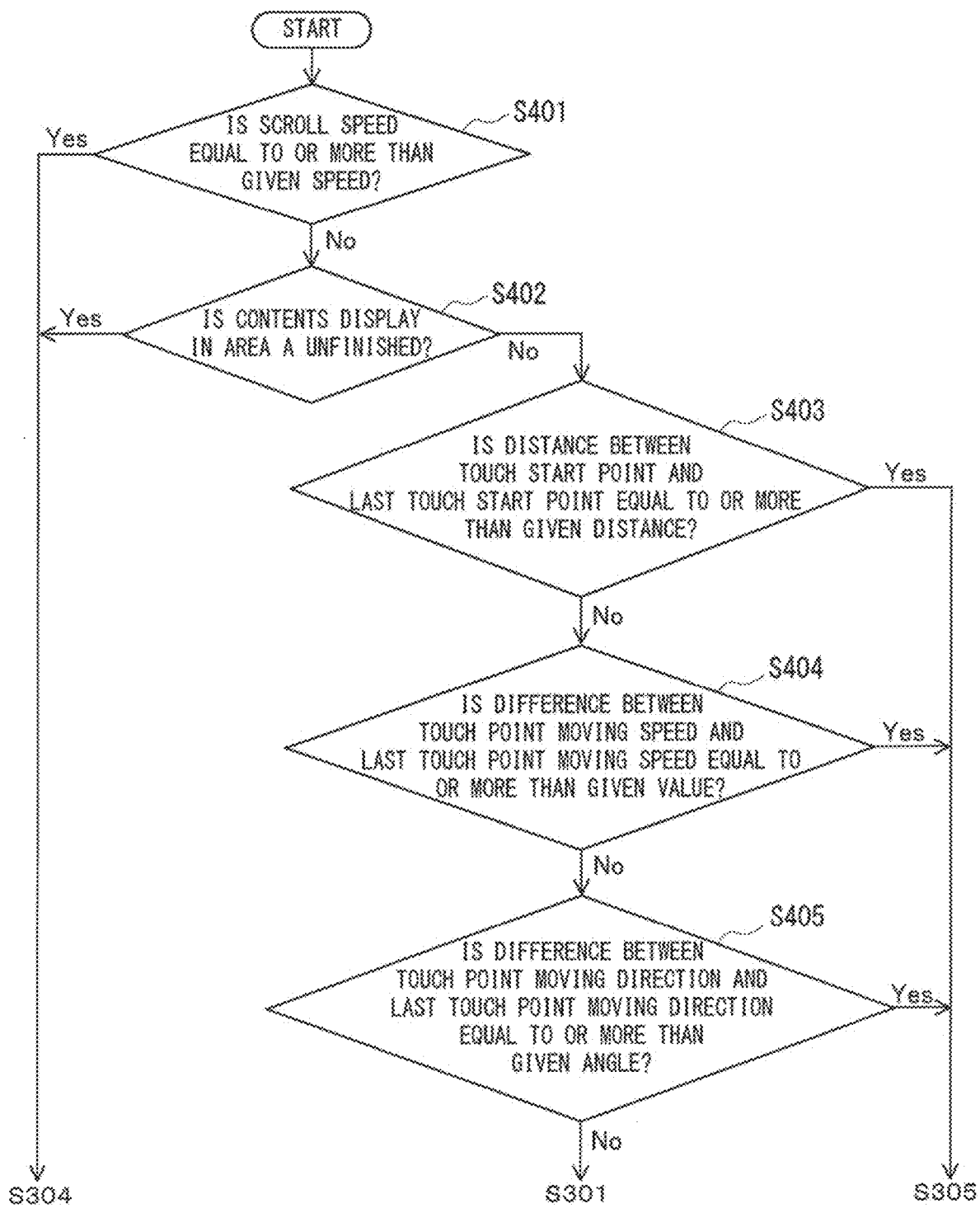
FIG. 10 is a flow chart illustrating a part of processing that is executed when the information processing device determines whether a user is aware of a certain area in the modification example of the first embodiment.
Figure 11:
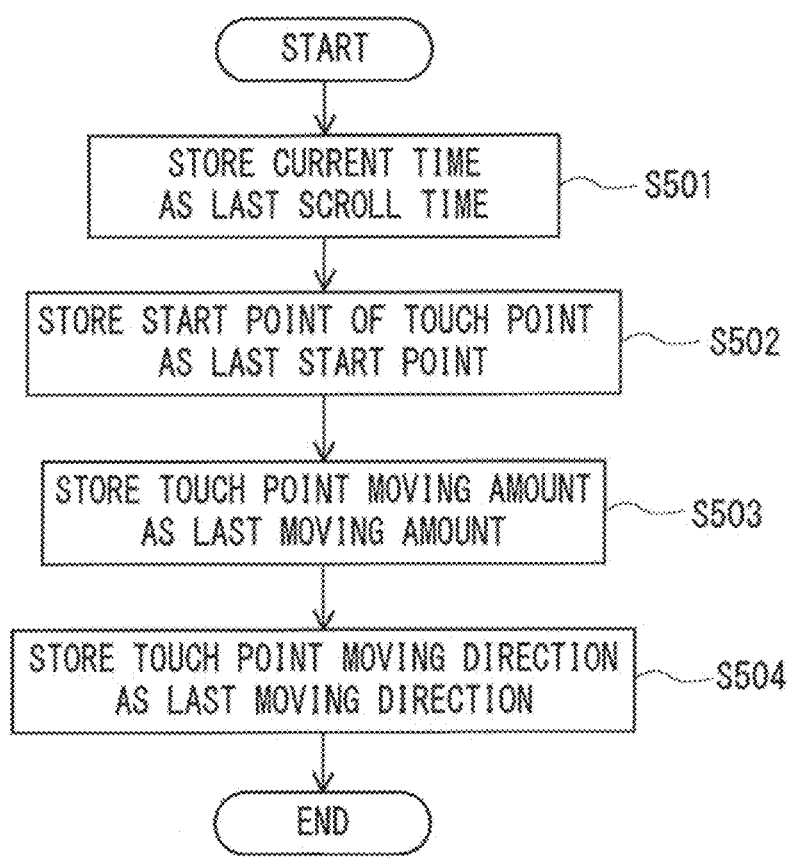
FIG. 11 is a flow chart illustrating processing that is executed when the information processing device stores information of a touch point and scroll in the modification example of the first embodiment.

In the modification example, the same processing as in Operation Example A is executed in the second drag operation with regard to FIG. 4 and FIG. 5 (except Step S206 and Step S210) in any of the operation examples described later. Processing illustrated in FIG. 10 is executed in Step S206 of FIG. 5 and processing illustrated in FIG. 11 is executed in Step S210 of FIG. 5. This processing in the second drag operation is described below.

When the user touches the touch panel 210 to start dragging for the second time, processing of the flow charts of FIGS. 4 and 5 (except S206) is executed as in the second drag operation in Operation Example A of the first embodiment.

When the processing proceeds to S206 of FIG. 5, S401 to S410 which are included in the flow chart of FIG. 10 are executed. Steps S401 to S410 each show a step in a procedure of determining whether or not the user is aware of the area A which is an area containing the first touch point. The order in which these determination steps are applied is not limited to the one illustrated in the drawing, and may be changed. Using only one of these determination processing steps alone is also an option and, in that case, too, the precision of determining whether or not the user is aware of the area A can be enhanced. The illustrated example uses these steps in combination so that the precision of the determination is enhanced even more.

In FIG. 10, the control unit 108 determines whether or not an area that is an ancestor to the area A obtained in S205 of FIG. 5 is scrolling at a speed equal to or higher than the scroll speed threshold (S401). When the scroll speed is equal to or higher than the scroll speed threshold (S401: Y), the control unit 108 decides against scrolling an image displayed in the area A (S304). In other words, the scrolling of the parent area of the area A is continued in this case. When the scroll speed is lower than the threshold (S401: N), the control unit 108 determines a display state of the area A that has been obtained in S305 by the display unit 106. Whether or not displaying an image to be displayed in the area A is unfinished is determined (S402). When displaying the image is unfinished (S402: Y), the control unit 108 decides against scrolling the image displayed in the area A. In other words, the scrolling of the parent area of the area A is continued in this case, too. While the example given here is one in which whether or not displaying the area A has been finished is determined, other methods based on the display state of the screen may be employed. For instance, the basis for determining whether to scroll the area A or not may be whether or not a given range of the area A, e.g., 80% of the area A, has been displayed.

In the case where displaying an image in the area A has been finished, the control unit 108 determines whether or not a distance between the touch start point detected by the receiving unit 105 and the touch start point 708 stored in the storing unit 109 is equal to or more than a given distance threshold (S403). When the distance is equal to or more than 20 pixels, which is a distance threshold shown as the distance threshold 705 in FIG. 8 (S403: Y), the control unit 108 proceeds to S305 of FIG. 6 described above, and determines that the image displayed in the area A is to be scrolled. When the distance is less than the given threshold (S403: N), the control unit 108 proceeds to the next determination step, S404.

The control unit 108 determines whether or not the difference between the touch point moving speed detected by the receiving unit 105 and the touch point moving speed stored in the storing unit 109 is equal to or more than the value of the moving speed threshold 706 (S404). In other words, the control unit 108 determines whether the scrolling of the first area (also referred to as parent area or background area) is to be continued or the second area (also referred to as child area or sub-area) is to be scrolled independently. This determination is made based on a scroll speed in the current scroll instruction and a scroll speed in the last scroll instruction. This difference is an absolute value in the modification example. This ensures that the result of the determination of S404 is "Y" irrespective of whether the touch point moving speed detected by the receiving unit 105 is higher or lower than the touch point moving speed stored in the storing unit 109. An alternative mode may be employed in which this difference is not set as an absolute value so that the determination of S404 yields the result "Y" only when the touch point moving speed detected by the receiving unit 105 is equal to or more than the touch point moving speed stored in the storing unit 109. When the difference is equal to or more than the value of the moving speed threshold 706 (when the difference is equal to or more than a given amount) (S404: Y), the control unit 108 proceeds to S305 of FIG. 6 described above, and determines that an image displayed in the area A is to be scrolled. When the difference is less than the touch point moving speed threshold (S404: N), the control unit 108 proceeds to the next determination step, S405.

The control unit 108 determines whether or not an angle between the touch point moving direction detected by the receiving unit 105 and the touch point moving direction 710 stored in the storing unit 109 is equal to or more than an angle set as the moving direction threshold (S405). In other words, the control unit 108 determines whether the scrolling of the first area is to be continued or the second area is to be scrolled independently, based on a scroll direction in the current scroll instruction and a scroll direction in the last scroll instruction. When the difference expressed as an angle between the detected touch point moving direction and the touch point moving direction 710 stored in the storing unit 109 is equal to or more than a given angle indicated by the moving direction threshold angle, the control unit 108 proceeds to S305 of FIG. 6 described above, and determines that an image displayed in the area A is to be scrolled. When the angle between the detected touch point moving direction and the touch point moving direction 710 stored in the storing unit 109 is less than the given angle, the control unit 108 moves to S301 of FIG. 6 described above.

While the control unit 108 in the description given above determines which area is to be scrolled based on the magnitude of the difference expressed as an angle between the current scroll direction and the last scroll direction, the present invention is not limited thereto. For instance, the user may have meant to instruct reverse scroll of the first area when the first area is scrolled upward immediately before the current scroll instruction which instructs downward scroll is issued in the second area. Under this hypothesis, the first area is to be scrolled as an exception even when the difference between the last scroll direction 710 and a direction in the current scroll instruction is 180 degrees or so. It is accordingly preferred in this case to use, as a basis, in which range (candidate group) the difference expressed as an angle between the detected touch point moving direction and the touch point moving direction 710 stored in the storing unit 109 falls, in addition to the magnitude of the difference expressed as an angle. This version of the modification example, too, is included in the scope of the present invention.

FIG. 11 illustrates, in S501 to S504, an example of details of processing that is executed in the modification example to store information of the touch point and the scroll time in S210 of FIG. 5. After executing S208 or S209 of FIG. 5, the control unit 108 stores the current time as the last scroll time in the storing unit 109 (S501). The start point of the touch point which has been obtained in S304 is then stored as a touch start point in the storing unit 109 (S502).

Thereafter, the control unit 108 then stores the moving speed of the touch point as the touch point moving speed 709 in the storing unit 109 (S503). The moving speed is obtained by the same procedure that is used to obtain the moving speed in S404 of FIG. 10 described above. The control unit 108 stores the moving direction of the touch point in the storing unit 109 as the touch point moving direction 710 (S504). The moving direction is obtained by the same procedure that is used obtain the moving direction in S405 of FIG. 10.

In the modification example, the control unit 108 which receives an input of a touch point from the receiving unit 105 operates as a speed detecting unit for detecting the scroll speed, and obtains the scroll speed from the moving speed of the touch point and the like. The scroll speed obtained in the modification example is a speed in a given period of time from the start of the touch. However, other arbitrary methods can be used to detect the scroll speed. For instance, the scroll speed can be an average speed in a period from the start of scroll in the first drag operation to the start of the next drag operation, or a speed immediately before the second dragging is started.

The moving speed of the touch point in S404 and other steps can be detected by an arbitrary method. In this example, the moving speed of the touch point is obtained by detecting the moving amount of the touch point for every given period of time, detecting, with the receiving unit 105, the amount of the movement of the touch point in the given period of time, and comparing the detected touch point moving amount against a touch point moving amount that is stored in the storing unit 109. The processing in this example is executed when the touch point moves, and touch point detection is therefore executed after a given period of time from the start of the touch. The location of the touch point at the start of the touch and the location of the touch point when the processing is executed after the given period of time therefore differ, and the distance between these two different locations may be used in obtaining the moving speed. In the case where the moving speed is expressed by the moving distance as this, the control unit 108 may determine in S404 whether or not the difference between the touch point moving distance and the last touch point moving distance is equal to or more than a given value.

Operation Example E

In Operation Example E, the user drags the background area 206 as in Operation Example A and subsequently drags the map area 207 which is displayed as a result of the scrolling of the background area 206. The difference from Operation Example A is that the start point of the first dragging and the start point of the second dragging are apart from each other by a distance equal to or more than the threshold distance.

When the user scrolls the screen by repeatedly dragging one area 201, it is likely that the start point in one drag operation is not far from the start point in another drag operation. The control unit 108 in Operation Example E therefore determines that the user has intentionally dragged the map area 207 when the start point of the second dragging is distanced by 20 pixels, which is shown as the distance threshold 705 in FIG. 8, or more. Accordingly, the control unit 108 in Operation Example E scrolls the background area 206 as a result of the first dragging, and scrolls the map area 207 as a result of the second dragging. Details thereof are described below.

What is displayed on the touch panel 210 when the first dragging is performed in Operation Example E is illustrated in FIG. 7A. FIG. 9A illustrates what is displayed on the touch panel 210 when the second dragging is performed in Operation Example E. The interval between the first dragging and the second dragging here is 200 ms. The scroll speed here is lower than a maximum scroll speed, and the map area 207 here has finished displaying what is to be displayed.

The background area 206 is scrolled first by processing that is executed in the first drag operation. This processing is the same as the one executed in the first drag operation in Operation Example A, and its description is omitted here.

Processing that is executed in the second drag operation is described next. S101 and subsequent processing steps of FIG. 4 are executed first when the user touches a touch point 801 illustrated in FIG. 9A and moves the touching finger for the first time. The control unit 108 determines that this touch point movement is the first move (S101), and determines a scroll target area (S102). In this processing of determining a scroll target area, the control unit 108 obtains the touch start point (S204) and obtains the area A displayed at the obtained location (S205) as illustrated in FIG. 5, which illustrates details of S102. In this example, where the map area 207 is at the touch start point as illustrated in FIG. 9A, the control unit 108 determines the map area 207 as the area A. Thereafter, the control unit 108 determines whether to scroll an image displayed in the area A or not (S206). The control unit 108 in Operation Example E proceeds to the processing of FIG. 10, which illustrates details of S206.

The control unit 108 first determines whether or not the scroll speed is equal to or more than a scroll speed threshold indicated by the scroll speed threshold 704 of FIG. 8, in this example, 100 pixels/s (S401). This determination is made in the control unit 108. In Operation Example E, where the scroll speed is less than the scroll speed threshold, the control unit 108 determines that the scroll speed is not equal to or more than the scroll speed threshold (S401: N). The control unit 108 next determines whether or not displaying of the area A by the display unit 106 is unfinished (S402). In this example, where the map area 207 which is the obtained area A has finished displaying as mentioned above, it is determined that the display unit 106 has finished displaying the area A (S402: N). The control unit 108 then determines whether or not the distance between the current touch start point and the touch start point 708 stored in the storing unit 109 is equal to or more than a distance threshold indicated by 705 of FIG. 8, namely, 20 pixels (S403).

The control unit 108 in Operation Example E determines that the distance between the current touch start point and the touch start point 708 stored in the storing unit 109 is equal to or more than the distance threshold indicated by 705 of FIG. 8 (S403: Y), and proceeds to S305 of FIG. 6. Thereafter, determining that the user is aware of the map area 207, the control unit 108 decides to scroll an image displayed in the area A. The control unit 108 then moves the processing on to S207 of FIG. 5, and determines whether to scroll an image displayed in the area A or not (S207). From the result of the determination in S403, the control unit 108 determines in S207 that an image displayed in the area A is to be scrolled (S207: Y), and determines, as a scroll target area, the map area 207 which has been determined as the area A (S208). Thereafter, the current time is stored as the last scroll time, and information of the touch point and the scroll target area is stored in the storing unit 109 (S210). The control unit 108 next moves the processing on to S103 of FIG. 4 to scroll an image displayed in the map area 207, and the display unit 106 displays the area 201 after the scroll.

The control unit 108 further determines whether or not the touch point has been released (S104). The processing of scrolling the map area 207 is repeatedly executed by repeatedly executing S101 to S104 of FIG. 4 in the manner described above, until the user moves the finger to the point 802 in FIG. 9A.

Operation Example F

In Operation Example F, the user drags the background area 206 as in Operation Example A and subsequently drags the map area 207 which is displayed as a result of the scrolling of the background area 206. The difference from Operation Example A is that the touch point moving speed in the first dragging and the touch point moving speed in the second dragging greatly differ from each other.

When the user scrolls the screen by repeatedly dragging one area 201, it is likely that the touch point moving speed varies little from one drag operation to another. The control unit 108 therefore determines that the user has intentionally dragged the map area 207 in the case where the touch point moving speed of the second dragging has changed from that of the first dragging by an amount equal to or more than a moving speed threshold shown as the moving speed threshold 706 in FIG. 8 (20 pixels/s). The control unit 108 in Operation Example F therefore scrolls an image displayed in the background area 206 as a result of the first dragging, and scrolls the image displayed in the map area 207 as a result of the second dragging. Details thereof are described below.

What is displayed on the touch panel 210 when the first dragging is performed in Operation Example F is illustrated in FIG. 7A. FIG. 9B illustrates what is displayed on the touch panel 210 when the second dragging is performed. The interval between the first dragging and the second dragging here is 200 ms. The scroll speed here is lower than a maximum scroll speed, and the map area 207 here has finished displaying what is to be displayed.

The entire background area 206 is scrolled first by processing that is executed in the first drag operation. This processing is the same as the one executed in the first drag operation in Operation Example A, and its description is omitted here. Processing that is executed in the second drag operation is described next. S101 and subsequent processing steps of FIG. 4 are executed first, when the user touches a touch point 803 illustrated in FIG. 9B and moves the touching finger for the first time.

The control unit 108 determines that this touch point movement is the first move (S101), and determines a scroll target area (S102). In this processing of determining a scroll target area, the control unit 108 obtains the touch start point (S204) and obtains the area A displayed at the obtained location (S205) as illustrated in FIG. 5, which illustrates details of S102. In this example, where the map area 207 is at the touch start point as illustrated in FIG. 9A, the control unit 108 determines the map area 207 as the area A. Thereafter, the control unit 108 determines whether to scroll an image displayed in the area A or not (S206). The control unit 108 in Operation Example F proceeds to the processing of FIG. 10, which illustrates details of S206.

The control unit 108 first determines whether or not the scroll speed is equal to or more than a scroll speed threshold indicated by the scroll speed threshold 704 of FIG. 8, in this example, 100 pixels/s (S401). This determination is made in the control unit 108. In Operation Example F, where the scroll speed is less than the scroll speed threshold, the control unit 108 determines that the scroll speed is not equal to or more than the scroll speed threshold (S401: N). The control unit 108 next determines whether or not displaying of the area A by the display unit 106 is unfinished (S402). In this example, the map area 207 which is the obtained area A has finished displaying as mentioned above, and it is determined that the display unit 106 has finished displaying the area A (S402: N). The control unit 108 then determines whether or not the distance between the current touch start point and the touch start point 708 stored in the storing unit 109 is equal to or more than a distance threshold indicated by 705 of FIG. 8, namely, 20 pixels (S403).

The control unit 108 in Operation Example F determines that the distance between the current touch start point and the touch start point 708 stored in the storing unit 109 is not equal to or more than a distance threshold indicated by 705 of FIG. 8 (S403: N). Thereafter, the control unit 108 determines whether or not the difference between the current touch point moving speed and the touch point moving speed stored in the storing unit 109 is equal to or more than the value of the moving speed threshold 706 of FIG. 8, in this example, 20 pixels/s (S404). In this example, the control unit 108 determines that the difference is equal to or more than the moving speed threshold (S404: Y), and proceeds to S305 of FIG. 5. Determining that the user is aware of the map area 207, the control unit 108 decides to scroll an image displayed in the area A.

The control unit 108 then moves the processing on to S207 of FIG. 5, and determines whether to scroll an image displayed in the area A or not (S207). From the result of the determination in S305, the control unit 108 determines in S207 that an image displayed in the area A is to be scrolled (S207: Y), and determines, as a scroll target area, the map area 207 which has been determined as the area A (S208). Thereafter, the control unit 108 stores the current time as the last scroll time, and also stores information of the touch point and the scroll target area in the storing unit 109 (S210).

The control unit 108 next moves the processing on to S103 of FIG. 4 to scroll an image displayed in the map area 207, and the display unit 106 displays the area 201 after the scroll.

The control unit 108 further determines whether or not the touch point has been released (S104). The processing of scrolling the map area 207 is repeatedly executed by repeatedly executing S101 to S104 of FIG. 4 in the manner described above, until the user moves the finger to the point 804 in FIG. 9B.

Operation Example G

In Operation Example G, the user drags the background area 206 as in Operation Example A and subsequently drags the map area 207 which is displayed as a result of the scrolling of the background area 206. The difference from Operation Example A is that the touch point moving direction in the first dragging and the touch point moving direction in the second dragging greatly differ from each other.

When the user scrolls the displayed image by repeatedly dragging one area 201, it is likely that the touch point moving direction in one drag operation does not greatly differ from the touch point moving direction in another drag operation. The control unit 108 therefore determines that the user has intentionally dragged the map area 207 when the touch point moving direction in the second dragging is distanced by an angle shown as the moving direction threshold 707 in FIG. 8 or more. The control unit 108 at this point scrolls the background area 206 as a result of the first dragging, and scrolls the map area 207 as a result of the second dragging. Details thereof are described below.

What is displayed on the touch panel 210 when the first dragging is performed in Operation Example G is illustrated in FIG. 7A. FIG. 9C illustrates what is displayed on the touch panel 210 when the second dragging is performed in Operation Example G. The interval between the first dragging and the second dragging here is 200 ms. The scroll speed here is lower than the maximum scroll speed, and the map area 207 here has finished displaying what is to be displayed.

The background area 206 is scrolled first by processing that is executed in the first drag operation. This processing is the same as the one executed in the first drag operation in Operation Example A, and its description is omitted here.

Processing that is executed in the second drag operation is described next. S101 and subsequent processing steps of FIG. 4 are executed first when the user touches a touch point 805 illustrated in FIG. 9A and moves the touching finger for the first time. The control unit 108 determines that this touch point movement is the first move (S101), and determines a scroll target area (S102). In this processing of determining a scroll target area, the control unit 108 obtains the touch start point (S204) and obtains the area A displayed at the obtained location (S205) as illustrated in FIG. 5, which illustrates details of S102. In this example, where the map area 207 is at the touch start point as illustrated in FIG. 9C, the control unit 108 determines the map area 207 as the area A. Thereafter, the control unit 108 determines whether to scroll an image displayed in the area A or not (S206). The control unit 108 in Operation Example E proceeds to the processing of FIG. 10, which illustrates details of S206.

The control unit 108 first determines whether or not the scroll speed is equal to or more than a scroll speed threshold indicated by the scroll speed threshold 704 of FIG. 8, in this example, 100 pixels/s (S401). This determination is made in the control unit 108. In Operation Example G, where the scroll speed is less than the scroll speed threshold, the control unit 108 determines that the scroll speed is not equal to or more than the scroll speed threshold (S401: N). The control unit 108 next determines whether or not displaying of the area A by the display unit 106 is unfinished (S402). In this example, where the map area 207 which is the obtained area A has finished displaying as mentioned above, it is determined that the display unit 106 has finished displaying the area A (S402: N). The control unit 108 then determines whether or not the distance between the current touch start point and the touch start point 708 stored in the storing unit 109 is equal to or more than a distance threshold indicated by 705 of FIG. 8, namely, 20 pixels (S403).

The control unit 108 in Operation Example G determines that the distance between the current touch start point and the touch start point 708 stored in the storing unit 109 is not equal to or more than the distance threshold indicated by 705 of FIG. 8 (S403: N). The control unit 108 next determines whether or not the difference between the current touch point moving speed and the touch point moving speed stored in the storing unit 109 is equal to or more than the value of the moving speed threshold 706 of FIG. 8, in this example, 20 pixels/s (S404). The control unit 108 in this example determines that the difference is not equal to or more than the moving speed threshold (S404: N). Thereafter, the control unit 108 determines whether or not the difference expressed as an angle between the current touch point moving direction and the touch point moving direction stored in the storing unit 109 as the touch point moving direction 710 of FIG. 8 is equal to or more than a given angle (S405). In this example, the difference expressed as an angle is smaller than an angle shown as the moving direction threshold 707 in FIG. 8 (60°), and the control unit 108 therefore determines that the difference expressed as an angle is equal to or more than the given angle (S405: Y). The processing in the control unit 108 then proceeds to S305 of FIG. 5. Determining that the user is aware of the map area 207, the control unit 108 determines that an image displayed in the area A is to be scrolled.

The control unit 108 moves the processing on to S207 of FIG. 5, and determines whether to scroll an image displayed in the area A or not (S207). From the result of the determination in S305, the control unit 108 decides in S207 to scroll an image displayed in the area A (S207: Y), and determines, as a scroll target area, the map area 207, which has been determined as the area A (S208). Thereafter, the current time is stored as the last scroll time, and information of the touch point and the scroll target area is stored in the storing unit 109. The control unit 108 next moves the processing on to S103 of FIG. 4 to scroll an image displayed in the map area 207, and the display unit 106 displays the area 201 after the scroll.

The control unit 108 further determines whether or not the touch point has been released (S104). The processing of scrolling the map area 207 is repeatedly executed by repeatedly executing S101 to S104 of FIG. 4 in the manner described above, until the user moves the finger to the point 806 in FIG. 9C.

Second Embodiment

When the user drags a child area (second area) inside a parent area (first area), the purpose thereof would be, in most cases, moving text or a symbol such as an image contained in the second area, or a particular area in the second area to the center of the first area. Described below is an example in which the map area 207 is the parent area and a message area 903 is the child area. A possible purpose of touching a point within the message area 903 and dragging is to display the message area 903 at the center of the map area 207. The user is therefore likely to be aware of the map area 207 when the user drags the map area 207 and, in conjunction, the message area 903 moves closer to the center of the map area 207.

The second embodiment therefore reduces the chance of accidental operation by determining whether or not the user is aware of the map area 207 based on the direction in which the user drags an image and where in the parent area the child area is displayed. The hardware configuration of an information processing device that can be employed in this embodiment is the same as the one described above with reference to FIG. 1A. The same configuration example that has been described with reference to FIG. 1B also applies to control programs that are stored in the ROM 102 or the HDD 103 in this embodiment. Detailed descriptions thereof are accordingly omitted here.

Processing that is executed in this embodiment when the receiving unit 105 detects the user's drag operation is illustrated in FIGS. 4, 5, and 6 as in the first embodiment and the modification example of the first embodiment. In this embodiment, however, different processing from the one in the first embodiment and its modification example is executed in S206 of FIG. 5. Details of the processing that is executed in S206 of FIG. 5 in this embodiment are therefore illustrated in FIG. 12. Details of the areas 201 in this embodiment are illustrated in FIG. 13A, and FIG. 13B is a diagram of a parent-child relation between the areas 201 in this embodiment.

Figures 13A, 13B:
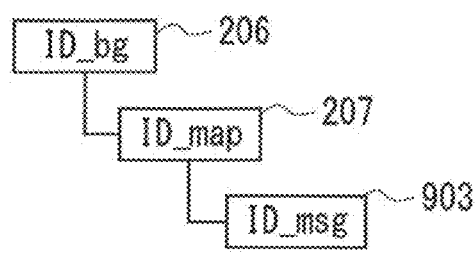
FIGS. 13A and 13B are respectively a diagram exemplifying data that is stored in a storing unit of an information processing device according to a third embodiment of the present invention and a diagram illustrating the hierarchy of area IDs.
Figure 14A:
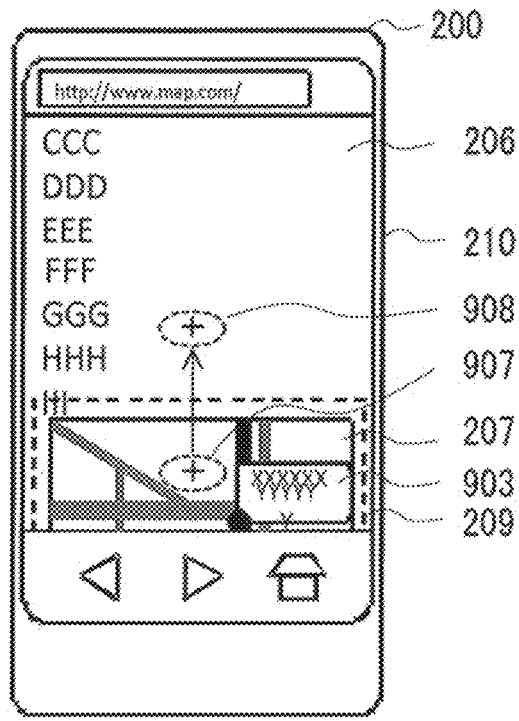
FIGS. 14A to 14D are explanatory diagrams illustrating operation examples according to the third embodiment.

The map area 207 is a child area of the background area 206 as in the first embodiment and its modification example, and the message area 903 is a child area of the map area 207. The message area is represented by "ID_msg903" in FIG. 13A. The parent-child relation of the background area 206, the map area 207, and the message area 903 described above is expressed as a parent-child relation of ID_bg206, ID_map207, and ID_msg903 in FIG. 13B. The screen of the touch panel 210 looks as illustrated in FIG. 7A when the first drag operation is performed in this embodiment, and the screen of the touch panel 210 looks as illustrated in FIG. 14A when the second drag operation is performed in this embodiment.

Processing that is executed in the first drag operation in this embodiment is the same as the one that is executed in the first drag operation in Operation Example A, and the steps illustrated in FIGS. 4, 5, and 6 are executed in the manner described above.

In the second drag operation, the control unit 108 executes S101 of FIG. 4 to execute S204, S205, and S206 of FIG. 5 as in the second drag operation of Operation Example A. However, the control unit 108 follows the flow chart of FIG. 12, instead of the flow chart of FIG. 6, in S206 of FIG. 5 in the second drag operation. To give a more detailed description, the control unit 108 executes S301 and subsequent processing steps of FIG. 12 after executing S205 of FIG. 5.

Figure 12:
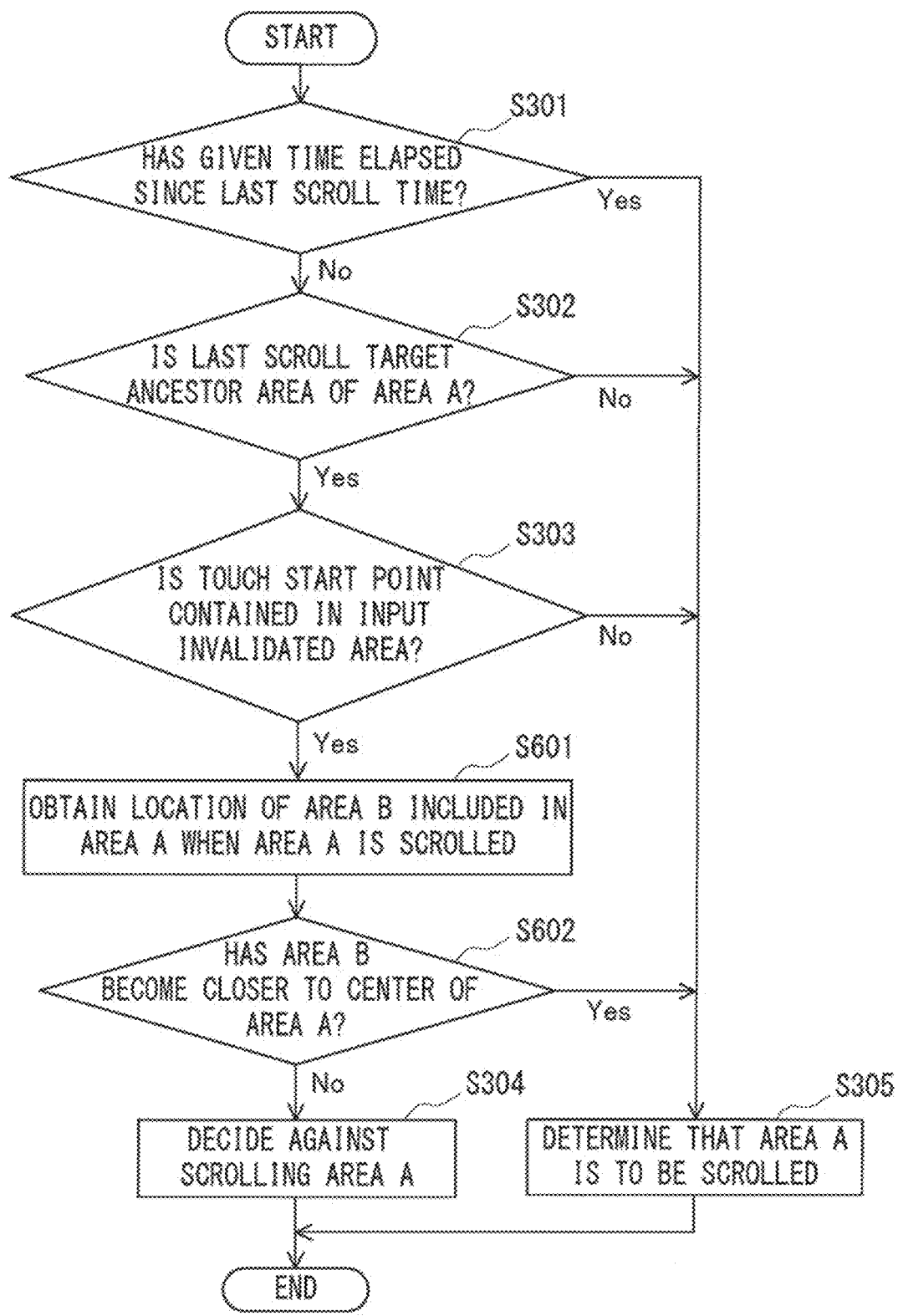
FIG. 12 is a flow chart illustrating processing that is executed when an information processing device according to a second embodiment of the present invention determines whether a user is aware of a certain area.

Processing that is executed in S301 to S305 in the flow chart of FIG. 12 is the same as the one described with reference to FIG. 6. The precision of determination about whether to scroll an image displayed in the area A, which is the area of the touch start point, or not can be improved both by executing one of Steps S301, S302, S303, and S602 of FIG. 12 alone, and by executing these steps in a different order. In this embodiment, these steps are executed in combination in the illustrated order so that the precision of the determination is enhanced even more.

In the case where the result of the determination by the control unit 108 in FIG. 12 is N in S301 and Y in S302, the processing proceeds to S303. When it is determined that the touch start point is contained within an input invalidated range (S303: Y), the control unit 108 obtains the post-scroll location of an area B, which is a child area inside the area A, on the supposition that the movement of the touch point has continued for a given period of time, causing the area A to scroll (S601). The area A is the map area 207, for example, and the area B is the message area 903, for example.

The control unit 108 next compares the location of the area B before the touch point movement continues and the post-scroll location obtained in S601 to determine whether or not the post-scroll location of the area B is closer to the center of the area A than before the scroll (S602). In the case where the post-scroll location of the area B is not closer to the center of the area A (S602: N), the control unit 108 proceeds to S304 and decides against scrolling an image displayed in the area A. In the case where the post-scroll location of the area B which is obtained in S601 is closer to the center of the area A (S602: Y), the control unit 108 proceeds to S305 and determines an image displayed in the area A is to be scrolled.

Operation Example H

In Operation Example H, the user first touches the point 501 as illustrated in FIG. 7A and drags upward toward the point 502, thereby scrolling the background area 206. The map area 207 is displayed on the touch panel 210 as a result. In this example, the map area 207 is contained in the scroll instruction invalidated range 209 before and after the first dragging.

Immediately thereafter, the user drags the map area 207 from a point 907 to a point 908 as illustrated in FIG. 14A. In the case where this drag operation continues for a given period of time, the message area 903 inside the map area 207 is displayed at this point at the center of the map area 207. The control unit 108 therefore determines that the user is aware of the map area 207. The control unit 108 consequently scrolls the map area 207. How long the drag operation lasts can be determined arbitrarily. For instance, whether or not the touch point has been released is detected cyclically in S104 of FIG. 4 in this embodiment, and a time required for one cycle of the release detection may be set as the length of time for which the drag operation lasts. Details of Operation Example H are described below.

Processing that is executed in the first drag operation is the same as the one executed in the first drag operation in Operation Example A, and its description is omitted here. Processing that is executed in the second drag operation is described next. In this example, the coordinates of the upper left corner of the screen of the illustrated information processing device 200 are treated as the origin (0, 0), the rightward direction of the screen is treated as the positive direction of the X-axis, and the downward direction of the screen is treated as the positive direction of the Y-axis.

When the second drag operation illustrated in FIG. 14A is performed, the message area 903 is at a location (200, 600), the center of the map area 207 is at a location (150, 500), and the movement amount of the touch point is (0, −5). In this example, the last scroll time is a time at which the user has touched the touch point 501 with a finger in FIG. 7A and started scrolling, and the time elapsed from the last scroll time is 200 ms. The processing of FIG. 4 is executed first when the user touches the point 907 in FIG. 14A and moves the touching finger for the first time. The control unit 108 determines that this touch point movement is the first move (S101), and determines a scroll target area (S102). Thereafter, the control unit 108 moves the processing on to FIG. 5, which illustrates details of processing executed in S102 of FIG. 4, obtains the touch start point (S204), and determines that the map area 207 is at the touch start point (S205).

The area A which is defined as an area displayed at the touch start point is accordingly the map area 207 in this example, and the control unit 108 determines whether to scroll an image displayed in the area A or not (S206). Thereafter, the control unit 108 moves the processing on to FIG. 12, which is a diagram illustrating details of S206 of FIG. 5 in the second embodiment. The control unit 108 then determines whether or not a given period has elapsed since the last scroll time (S301).

The elapsed time in this example is 200 ms, which is less than the maximum operation interval 208 of FIG. 8, 500 ms. The control unit 108 therefore determines that the given period has not elapsed (S301: N). The control unit 108 subsequently determines whether or not the last scroll target area is an area that is an ancestor to the area A (S302).

The scroll target in the last scroll which is illustrated in FIG. 7A is the background area 206, which is an ancestor to the map area 207. The result of the determination in S302 by the control unit 108 is therefore Y, and whether or not the touch start point is contained in the input invalidated range is determined subsequently (S303). The map area 207 is contained in the scroll instruction invalidated range 209 as illustrated in FIG. 14A and, accordingly, the result of the determination is Y. Thereafter, the control unit 108 acts on the supposition that the area A (the map area 207 in this example) has been scrolled by the movement of the touch point, and obtains the post-scroll location of the area B (the message area 903 in this example) which is a child area of the area A in this case (S601).

The message area 903 is at a location (200, 600) and the touch point is moved by an amount (0, −5) as mentioned above. The post-scroll location of the message area 903 is calculated as (200, 595) by adding the movement amount of the touch point to the location of the message area 903.

The control unit 108 next determines whether or not the message area 903 which is the area B is closer to the center of the map area 207 which is the area A than before the scroll. Specifically, the control unit 108 calculates, as a pre-scroll distance, the distance between the center of the map area 207 and the message area 903 prior to the scroll. The center of the map area 207 is at a location (150, 500) and the message area 903 is located at (200, 600) prior to the scroll as mentioned above. The distance is therefore obtained by a mathematical expression $\{(200-150)2+(600-550)2\}(\frac{1}{2})$, and the resultant value is approximately 70.71.

The control unit 108 next calculates, as a post-scroll distance, the distance between the location of the center of the map area 207 and the message area 903 after the scroll. The distance is calculated by a mathematical expression $\{(200-150)2+(595-550)2\}(\frac{1}{2})$. The resultant value is approximately 67.27.

The control unit 108 determines as a result that the movement of the area B which is in conjunction with the scrolling of the area A has brought the area B closer to the center of the area A (S602: Y), and determines that an image displayed in the area A is to be scrolled (S305). The processing of the control unit 108 consequently returns to FIG. 5 and, determining that the user is aware of the map area 207, decides to scroll an image displayed in the area A (S207: Y). The control unit 108 thus determines the image displayed in the area A as a scroll target area (S208), stores the current time as the last scroll time, and also stores information of the touch point and the scroll target area in the storing unit 109 (S210). The control unit 108 then returns to the processing of FIG. 4 to scroll the area A which has been determined as the scroll target area, namely, an image displayed in the map area 207 (S103), and the display unit 106 displays the area 201 after the scroll.

The control unit 108 further determines whether or not the touch point has been released (S104). The processing of scrolling the map area 207 is repeatedly executed by repeatedly executing S101 to S104 of FIG. 4 in the manner described above, until the user moves the finger to the point 1008 in FIG. 14A.

Third Embodiment

In the first embodiment and the second embodiment, the parent-child relation of the areas 201 illustrated in FIG. 8 has one hierarchy level. In other words, the parent-child relation is made up of the background area 206 which is the parent area and the map area 207 which is the child area. The areas 201, however, can form a parent-child relation that has a plurality of hierarchy levels. The third embodiment describes an example of the case where the parent-child relation of the areas 201 has a plurality of hierarchy levels. The hardware configuration of an information processing device that can be employed in this embodiment is the same as the one described above with reference to FIG. 1A. The same configuration example that has been described with reference to FIG. 1B also applies to control programs that are stored in the ROM 102 or the HDD 103 in this embodiment. Detailed descriptions thereof are accordingly omitted here.

Processing that is executed in this embodiment when the receiving unit 105 detects the user's drag operation is illustrated in FIGS. 4, 5, and 6 as in the first embodiment and the modification example of the first embodiment. In this embodiment, however, processing illustrated in FIG. 5 is different from the one described above in the first embodiment and others. Details of the processing that is executed in FIG. 5 in this embodiment are therefore illustrated in FIG. 15.

Figure 15:
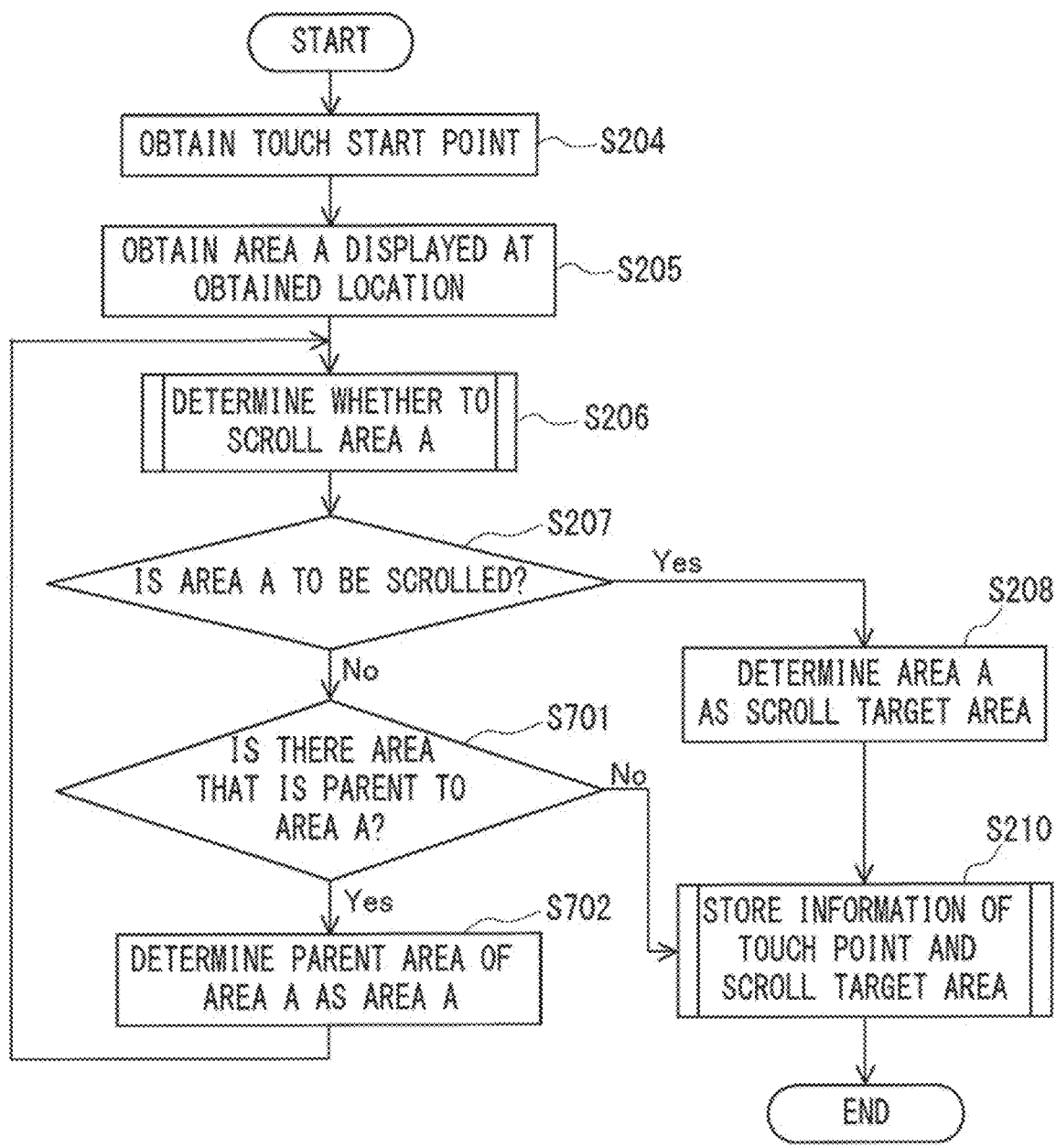
FIG. 15 is a flow chart of processing that is executed when the information processing device according to the third embodiment detects the movement of a touch point.

FIG. 15 is a flow chart illustrating concretely processing that is executed in S102 of FIG. 4 in this embodiment in order to determine the scroll target area 203. Processing executed in S204 to S210 in this flow chart is the same as the one in FIG. 5 described above, and details thereof are omitted here. When it is determined in S207 of FIG. 5 that an image displayed in the area A is not to be scrolled (S207: N), the control unit 108 checks if there is an area parent to the area A (S701). When the area A does not have a parent area (S701: N), the current time is stored as the last scroll time and information of the touch point and the scroll target area is also stored in the storing unit 109 (S210). When the area A has a parent area (S701: Y), the control unit 108 determines, as the area A, the area that is a parent to the area obtained in S205 of FIG. 15 (S702). Thereafter, the control unit 108 returns to S206 to execute subsequent steps again.

Operation Example I

Figure 14B:
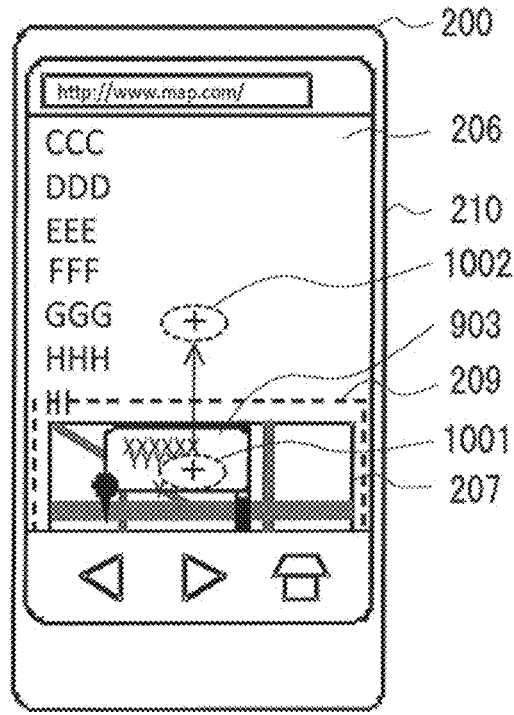

In Operation Example I, the user first touches the background area 206 and performs drag operation for the first time as illustrated in FIG. 7A. The background area 206 scrolls as a result, causing the touch panel 210 to display the map area 207 and the message area 903, which is contained in the map area 207, as illustrated in FIG. 14B. In this example, the map area 207 is contained in the scroll instruction invalidated range 209 and the message area 903 is a child area of the map area 207. The map area 207 is a child area of the background area 206, which makes the message area 903 a grandchild area of the background area 206.

After 200 ms elapses since the first drag operation, the user touches the same point once more in an attempt to drag the background area 206. However, the user is unaware of the message area 903 displayed and drags the message area 903 by mistake. In Operation Example I, the control unit 108 determines that the user is unaware of the message area 903, and consequently scrolls an image displayed in the background area 206. Details thereof are described below.

Processing that is executed in the first drag operation in Operation Example I is the same as the one that is executed in the first drag operation in Operation Example A, and details thereof are omitted here. Although the processing of FIG. 5 is replaced with the processing of FIG. 15 in the third embodiment, the processing of FIG. 15 does not move to steps different from the ones in FIG. 5 in the first drag operation. Accordingly, in this operation example where FIG. 15 is used instead of FIG. 5, too, the same processing as that of the first drag operation in Operation Example A is executed in the first drag operation. However, the screen of the information processing device 200 looks as illustrated in FIG. 14B after the first drag operation in Operation Example I, as opposed to FIG. 7B which is how the screen looks after the first drag operation in Operation Example A.

Processing that is executed in the second drag operation is described next. The processing of FIG. 4 is executed when the user touches a point 1001 in the message area which is illustrated in FIG. 14B and moves the touching finger for the first time. The control unit 108 determines that this touch point movement is the first move in the second drag operation (S101), and determines a scroll target area (S102).

Referring to FIG. 5, which is a diagram illustrating details of S102 of FIG. 4, the control unit 108 obtains the touch start point (S204) and obtains the area A displayed at the obtained location (S205). In this example, where the point 1001 of FIG. 14B is in the message area 903, the area A is the message area 903. The control unit 108 next determines whether to set an image displayed in the area A as a scroll target or not (S206).

As illustrated in FIG. 6, which details S206 of FIG. 5, the control unit 108 determines whether or not the time of the touch is within a given period from the last scroll time (S301). In this example, where the time elapsed since the last scroll time is 200 ms, which is less than the value set as the maximum operation interval threshold, 500 ms, it is determined that the time of the touch is within the given period (S301: Y), and the control unit 108 proceeds to S302.

Next, whether or not the last scroll target is an area that is an ancestor to the map area 207 is determined (S302). The last scroll target is the background area 206 which is an ancestor to the message area 903 (S302: Y), and the control unit 108 accordingly proceeds to S303. The control unit 108 determines whether or not the touch point 1001 is contained in the scroll instruction invalidated range 209 (S303). In this example, the touch point 1001 is contained in the scroll instruction invalidated range 209 (S303: Y), and the control unit 108 accordingly proceeds to Step S304. The control unit 108 then determines that the user is unaware of the area A (here, the message area 903), and decides against scrolling an image displayed in the area A (S304).

After performing the determination in S304 of FIG. 6, the control unit 108 moves the processing on to S207 of FIG. 15, and determines that an image displayed in the area A is not to be scrolled (S207: N). The control unit 108 then determines whether or not there is an area that is a parent to the area A (S701). In this example, the area A is the message area 903 and the map area 207 is an area parent to the message area 903. The control unit 108 accordingly determines that the area A has a parent area (S701: Y), and newly determines the parent area of the current area A (the parent area in this example is the map area 207) as the area A (S702). The control unit 108 then returns to S206 of FIG. 15. As illustrated in FIG. 6, which details S206 of FIG. 5, the control unit 108 determines whether or not the time of the touch is within a given period from the last scroll time (S301). In this example, where the time elapsed since the last scroll time is 200 ms, which is less than the value set as the maximum operation interval threshold, 500 ms, it is determined that the time of the touch is within the given period (S301: Y), and the control unit 108 proceeds to S302.

Next, whether or not the last scroll target is an area that is an ancestor to the area A, namely, the map area 207, is determined (S302). The last scroll target is the background area 206 which is an ancestor to the map area 207 (S302: Y), and the control unit 108 accordingly proceeds to S303. The control unit 108 determines whether or not the touch point 1001 is contained in the scroll instruction invalidated range 209 (S303). In this example, the touch point 1001 is contained in the scroll instruction invalidated range 209 (S303: Y), and the control unit 108 accordingly proceeds to Step S304. The control unit 108 then determines that the user is unaware of the map area 207, and decides against scrolling an image displayed in the area A (S304).

After performing the determination in S304 of FIG. 6, the control unit 108 moves the processing on to S207 of FIG. 15, and determines that an image displayed in the area A is not to be scrolled (S207: N). The control unit 108 then determines whether or not there is an area that is a parent to the area A (S701). In this example, the area A is the map area 207 and the background area 206 is an area parent to the map area 207. The control unit 108 accordingly determines that the area A has a parent area (S701: Y), and newly determines the parent area of the current area A (the parent area in this example is the background area 206) as the area A (S702).

The control unit 108 then returns to S206 of FIG. 15. As illustrated in FIG. 6, which details S206 of FIG. 5, the control unit 108 determines whether or not the time of the touch is within a given period from the last scroll time (S301). In this example, where the time elapsed since the last scroll time is 200 ms, which is less than the value set as the maximum operation interval threshold, 500 ms, it is determined that the time of the touch is within the given period (S301: Y), and the control unit 108 proceeds to S302.

Next, whether or not the last scroll target is an area that is an ancestor to the current area A, namely, the background area 206, is determined (S302). The last scroll target here is the background area 206, which is the current area A. It is therefore determined that the last scroll target is not an area that is an ancestor to the current area A (S302: N). The control unit 108 determines that the user is aware of the background area 206, and decides to scroll an image displayed in the area A (S305). As a result, the control unit 108 moves the processing on to S207 of FIG. 15 to determine that an image displayed in the area A is to be scrolled (S207: Y), and determines the current area A (i.e., the background area 206) as a scroll target area (S208). Thereafter, the control unit 108 stores the current time as the last scroll time, and also stores information of the touch point and the scroll target area in the storing unit 109 (S210).

The processing in the control unit 108 next returns to FIG. 4 in order to scroll an image displayed in the background area 206, which has been determined as the scroll target area (S103). Thereafter, whether the touch point has been released or not is determined (S104). S101, S103, and S104 of FIG. 4 are then executed sequentially and repeatedly until the finger reaches a point 1002 of FIG. 14B and releases the touch point. When the touch point is released, the processing is ended.

Operation Example J

Figure 14C:
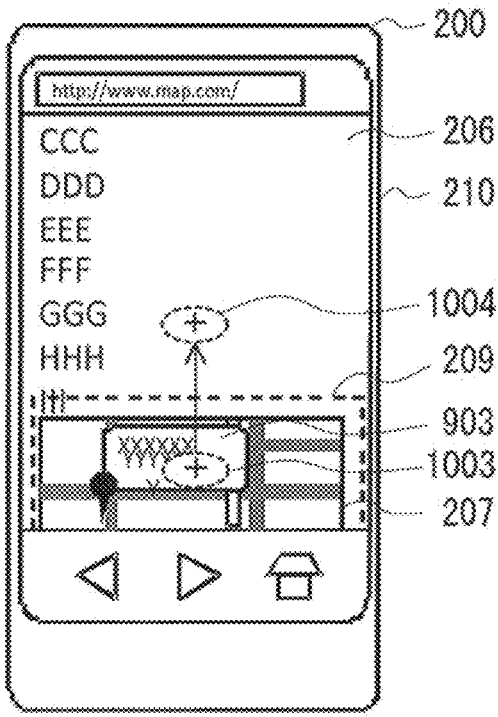

In Operation Example J, unlike in Operation Example I, the map area 207 is already displayed on the touch panel 210 at the time the first dragging is started as illustrated in FIG. 7B. The user first touches and drags the touch point 503 within the map area 207 in FIG. 7B. The map area 207 scrolls as a result and, after the first dragging is finished, the message area 903 is displayed on the touch panel 210 as illustrated in FIG. 14C. After 200 ms elapses since the first drag operation, the user attempts to drag the map area 207 again. However, the user is unaware of the message area 903 displayed and touches and drags a touch point 1003 in the message area 903 by mistake. The control unit 108 at this point determines that the user is unaware of the message area 903, and consequently scrolls an image displayed in the map area 207. Details thereof are described below.

Processing that is executed in the first drag operation in Operation Example J is the same as the one that is executed in the first drag operation in Operation Example C, where the initial screen looks as illustrated in FIG. 7B as in Operation Example J, and details thereof are therefore omitted here. However, the screen after the first dragging in Operation Example J is in a state illustrated in FIG. 14C, as opposed to FIG. 7C which illustrates the state of the screen after the first dragging in Operation Example C.

Processing that is executed in the second drag operation is described next. Processing of FIG. 4 is executed when the user touches a touch point 1003 illustrated in FIG. 14C and moves the touching finger for the first time. The control unit 108 determines that this touch point movement is the first move in the second drag operation (S101), and determines a scroll target area (S102).

The processing illustrated in the flow chart of FIG. 5 is executed in S102 of FIG. 4 in the operation examples described above. In the second drag operation in Operation Example J, however, the processing illustrated in the flow chart of FIG. 15 is executed instead. Referring to FIG. 15, the control unit 108 obtains the touch start point (S204) and obtains the area A displayed at the obtained location (S205). In this example, where the point 1003 of FIG. 14C is in the message area 903, the area A is the message area 903. The control unit 108 next determines whether to set an image displayed in the area A as a scroll target or not (S206).

As illustrated in FIG. 6, which details S206 of FIG. 5, the control unit 108 determines whether or not the time of the touch is within a given period from the last scroll time (S301). In this example, where the time elapsed since the last scroll time is 200 ms, which is less than the value set as the maximum operation interval threshold, 500 ms, it is determined that the time of the touch is within the given period (S301: Y), and the control unit 108 proceeds to S302. Next, whether or not the last scroll target is an area that is an ancestor to the area A is determined (S302). The last scroll target is the map area 207 which is an ancestor to the message area 903 (S302: Y), and the control unit 108 accordingly proceeds to S303. The control unit 108 determines whether or not the touch point 503 is contained in the scroll instruction invalidated range 209 (S303). In this example, the touch point 503 is contained in the scroll instruction invalidated range 209 (S303: Y), and the control unit 108 accordingly proceeds to Step S304. The control unit 108 then determines that the user is unaware of the area A (here, the message area 903), and decides against scrolling an image displayed in the area A (S304).

After performing the determination in S304 of FIG. 6, the control unit 108 returns to FIG. 15 to move the processing on to S207, and determines that an image displayed in the area A is not to be scrolled (S207: N). The control unit 108 then determines whether or not there is an area that is a parent to the area A (S701). In this example, the area A is the message area 903 and the map area 207 is an area parent to the message area 903. The control unit 108 accordingly determines that the area A has a parent area (S701: Y), and newly determines the parent area of the current area A (the parent area in this example is the map area 207) as the area A (S702).

After executing S702, the processing returns to S206. As illustrated in FIG. 6, which details S206 of FIG. 5, the control unit 108 determines whether or not the time of the touch is within a given period from the last scroll time (S301). In this example, where the time elapsed since the last scroll time is 200 ms, which is less than the value set as the maximum operation interval threshold, 500 ms, it is determined that the time of the touch is within the given period (S301: Y), and the control unit 108 proceeds to S302.

Next, whether or not the last scroll target is an area that is an ancestor to the current area A, namely, the map area 207, is determined (S302). The last scroll target here is the map area 207, which is the current area A. It is therefore determined that the last scroll target is not an area that is an ancestor to the current area A (S302: N). The control unit 108 determines that the user is aware of the map area 207, and decides to scroll an image displayed in the area A (S305). As a result, the control unit 108 moves the processing on to S207 of FIG. 15 to determine that an image displayed in the area A is to be scrolled (S207: Y), and determines an image displayed in the current area A as a scroll target area (S206). Thereafter, the control unit 108 stores the current time as the last scroll time, and also stores information of the touch point and the scroll target area in the storing unit 109 (S210).

The processing in the control unit 108 returns to FIG. 4 in order to scroll the map area 207, which has been determined as the scroll target area (S103). Thereafter, whether the touch point has been released or not is determined (S104). S101, S103, and S104 of FIG. 4 are then executed sequentially and repeatedly until the finger reaches a point 1004 of FIG. 14C and releases the touch point. When the touch point is released, the processing is ended.

Operation Example K

Operation Example K is an example in which the message area 903 is scrolled when the user is aware of the message area 903 and drags the message area 903, even though the area that has been dragged immediately before is the background area.

Figure 14D:
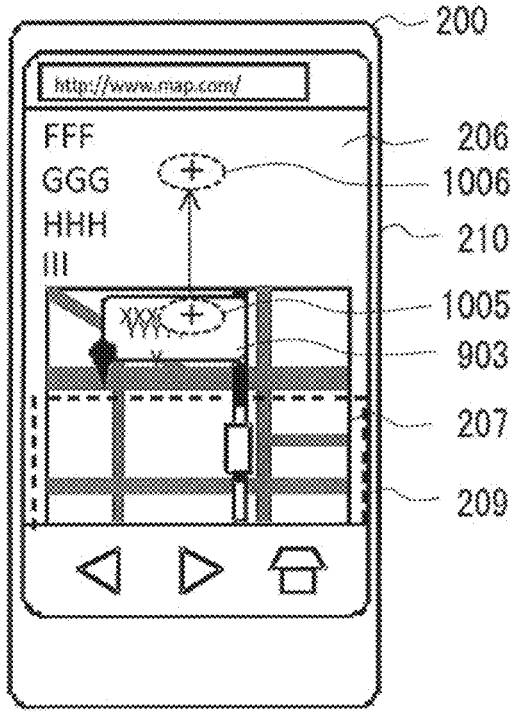

In Operation Example K, the user first touches and drags the background area 206. The background area 206 consequently scrolls, causing the touch panel 210 to display the map area 207 and the message area 903, which is contained in the map area 207. The map area 207 and the message area 903 at this point stretch beyond the scroll instruction invalidated range 209. After 200 ms elapses since this first drag operation, the user touches a touch point 1005 in the message area 903 which is illustrated in FIG. 14D and attempts to drag. The control unit 108 in this case determines that the user is aware of the message area 903 and consequently scrolls the message area 903. Details thereof are described below.

Processing that is executed in the first drag operation is the same as the one that is executed in the first drag operation in Operation Example A, and its description is therefore omitted here. However, the screen after the first drag operation is finished looks as illustrated in FIG. 14D unlike in Operation Example A. Processing that is executed in the second drag operation is described next. The processing of FIG. 4 is executed when the user touches a point 1005 which is illustrated in FIG. 14D and moves the touching finger for the first time. The control unit 108 determines that this touch point movement is the first move in the second drag operation (S101), and determines a scroll target area (S102).

Referring to FIG. 5, which is a diagram illustrating details of S102 of FIG. 4, the control unit 108 obtains the touch start point (S204) and obtains the area A displayed at the obtained location (S205). In this example, where the point 503 of FIG. 14D is in the message area 903, the area A is the message area 903. The control unit 108 next determines whether to set an image displayed in the area A as a scroll target or not (S206).

As illustrated in FIG. 12, which details S206 of FIG. 5 in this embodiment, the control unit 108 determines whether or not the time of the touch is within a given period from the last scroll time (S301). In this example, where the time elapsed since the last scroll time is 200 ms, which is less than the value set as the maximum operation interval threshold, 500 ms, it is determined that the time of the touch is within the given period (S301: Y), and the control unit 108 proceeds to S302.

Next, whether or not the last scroll target is an area that is an ancestor to the area A is determined (S302). The last scroll target is the map area 207 which is an ancestor to the message area 903 (S302: Y), and the control unit 108 accordingly proceeds to S303. The control unit 108 determines whether or not the touch point 503 is contained in the scroll instruction invalidated range 209 (S303).

The control unit 108 determines that the touch point 503 is not contained in the scroll instruction invalidated range 209 (S303: N). Thereafter, the control unit 108 determines that the user is aware of the message area 903, and decides to scroll an image displayed in the area A (S305).

After performing the determination in S304 of FIG. 12, the control unit 108 moves the processing on to S207 of FIG. 15, and determines that an image displayed in the area A is to be scrolled (S207: Y). The control unit 108 then determines the area A, namely, the message area 903, as the scroll target area (S208). The control unit 108 subsequently stores the current time as the last scroll time, and also stores information of the touch point and the scroll target area in the storing unit 109 (S210).

The processing in the control unit 108 next returns to FIG. 4, and the message area 903 determined as a scroll target area is scrolled (S103). Whether or not the touch point has been released is then determined (S104). Until the finger reaches a point 1006 of FIG. 14D and releases the touch point, S101, S103, and S104 of FIG. 4 are executed sequentially and repeatedly. The processing is ended when the touch point is released. As has been described, by determining whether or not the user is aware of one of the areas 201, the third embodiment is capable of reducing accidental operation also when the parent-child relation of the areas 201 has a plurality of hierarchy levels.

The devices described in the embodiments above can each be implemented also by supplying a system or a device with a storage medium in which a program code (control program) of software that implements the function of the embodiment is recorded. In this case, a computer (or CPU or MPU) of the system or of the device reads and executes the computer-readable program code stored in the storage medium.

Then the program code read out of the storage medium itself implements the function of the embodiment described above, and the storage medium storing the program code constitutes one embodiment of the present invention. The storage medium for supplying the program code can be, for example, a flexible disk, a hard disk, an optical disc, a magneto-optical disc, a CD-ROM, a CD-R, a magnetic tape, a non-volatile memory card, or a ROM.

The present invention is not limited to implementing the function of the embodiment described above by executing the read program code on the computer. The present invention also includes a case where an operating system (OS) or the like that is running on the computer carries out a part of or the entirety of actual processing by following an instruction of the program code, and the function of the embodiment described above is implemented by the processing.

The present invention further includes a case where the program code read out of the storage medium is written in a memory that is provided in an expansion board inserted in the computer, or in an expansion unit connected to the computer, a CPU or the like that is provided in the expansion board or the expansion unit carries out a part of or the entirety of actual processing by following an instruction of the program code, and the function of the embodiment described above is implemented by the processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-038973, filed Feb. 28, 2013, and Japanese Patent Application No. 2013-243943, filed Nov. 26, 2013, which are hereby incorporated by reference herein in their entirety.

What is claimed is:

1. An information processing device, which performs control for scrolling a WEB page that is displayed on a display and that includes a scrollable first area and a second area, which is within the first area and which is scrollable independently of the first area, the information processing device comprising:

one or more processors; and a memory storing instructions, which, when executed by the one or more processors, causes the information processing device to:

receive information that specifies a touch point on the display and that instructs to scroll the WEB page corresponding to the specified touch point;

determine a particular range of the display which is determined in response to a direction in which the first area has been scrolled by a last scroll instruction, wherein the particular range is determined to be a bottom section of the display in a case where the WEB page has been scrolled upward by the last scroll instruction, and is determined to be a top section of the display in a case where the WEB page has been scrolled downward by the last scroll instruction, wherein the particular range is not explicitly displayed in the display;

determine, in a case where a start point of a current scroll instruction is contained in the second area which is within the first area and the start point is contained in the particular range, that the first area is to be scrolled;

determine, in a case where the start point is contained in the second area which is within the first area and the start point is not contained in the particular range, that the second area is to be scrolled independently of the first area; and perform scrolling of one of the first area and the second area that is determined to be scrolled based on movement of the specified touch point initiated in the second area, wherein during the scrolling the position and the size of the particular range are not changed.

2. An information processing device according to claim 1, wherein the first area includes a WEB page and the second area includes a map area which is displayed within the WEB page.

3. An information processing device, which performs control for scrolling a WEB page that is displayed on a display and that includes a scrollable first area and a second area which is within the first area and which is scrollable independently of the first area, on the display, the information processing device comprising:

one or more processors; and a memory storing instructions, which, when executed by the one or more processors, causes the information processing device to:

receive information that specifies a touch point on the display and that instructs to scroll the WEB page corresponding to the specified touch point;

determine scroll directions in the received scroll instructions;

determine, in a case where a start point of a current scroll instruction is contained in the second area which is within the first area and an angle between a scroll direction in the current scroll instruction and a scroll direction in a last scroll instruction is less than a given amount, that the first area is to be scrolled;

determine, in a case where the start point is contained in the second area which is within the first area and the scroll direction in the current scroll instruction and the angle between the scroll direction in the current scroll instruction and the scroll direction in the last scroll instruction is equal to or more than the given amount, that the second area is to be scrolled independently of the first area; and perform scrolling of one of the first area and the second area that is determined to be scrolled based on movement of the specified touch point initiated in the second area.

4. An information processing device according to claim 3, wherein the first area includes a WEB page and the second area includes a map area which is displayed within the WEB page.

5. An information processing device, which performs control for scrolling a WEB page that is displayed on a display and that includes a scrollable first area and a second area which is within the first area and which is scrollable independently of the first area, the information processing device comprising:

one or more processors; and a memory storing instructions, which, when executed by the one or more processors, causes the information processing device to:

receive information that specifies a touch point on the display and that instructs to scroll the WEB page corresponding to the specified touch point;

determine a scroll speed of the received scroll instructions based on a movement speed of the specified touch point;

determine, in a case where a start point of a current scroll instruction is contained in the second area which is within the first area and a difference between a scroll speed in the current scroll instruction and a scroll speed in a last scroll instruction is less than a given amount, that the first area is to be scrolled;

determine, in a case where the start point is contained in the second area which is within the first area and the difference between the scroll speed in the current scroll instruction and the scroll speed in the last scroll instruction is equal to or more than the given amount, that the second area is to be scrolled independently of the first area; and perform scrolling of one of the first area and the second area that is determined to be scrolled based on movement of the specified touch point initiated in the second area.

6. An information processing device according to claim 5, wherein the first area includes a WEB page and the second area includes a map area which is displayed within the WEB page.

7. An information processing device, which performs control for scrolling a WEB page that is displayed on a display and that includes a scrollable first area and a second area which is within the first area and which is scrollable independently of the first area, the information processing device comprising:

one or more processors; and a memory storing instructions, which, when executed by the one or more processors, causes the information processing device to:

receive information that specifies a touch point on the display and that instructs to scroll the WEB page corresponding to the specified touch point;

determine a scroll speed of the received scroll instructions based on a movement speed of the specified touch point;

determine, in a case where a start point of a current scroll instruction is contained in the second area which is within the first area and a scroll speed of the first area that is instructed by a last scroll instruction is equal to or higher than a predetermined value, that the first area is to be scrolled;

determine, in a case where the start point is contained in the second area which is within the first area and the scroll speed of the first area that is instructed by the last scroll instruction is lower than a predetermined value, that the second area is to be scrolled independently of the first area; and perform scrolling of one of the first area and the second area that is determined to be scrolled based on movement of the specified touch point initiated in the second area.

8. An information processing device according to claim 7, wherein the first area includes a WEB page and the second area includes a map area which is displayed within the WEB page.

9. An information processing device, which performs control for scrolling a WEB page that is displayed on a display and that includes a scrollable first area and a second area which is within the first area and which is scrollable independently of the first area, comprising:
one or more processors; and
a memory storing instructions, which, when executed by the one or more processors, causes the information processing device to:
receive information that specifies a touch point on the display and that instructs to scroll the WEB page corresponding to the specified touch point;
determine, in a case where that a start point of a current scroll instruction is contained in the second area which is within the first area and displaying all the area of the second area is finished, that the first area is to be scrolled, based on whether or not contents displayed in the second area are finished;
determine, in a case where the start point is contained in the second area which is within the first area and displaying all the area of the second area is not finished, that the second area is to be scrolled independently of the first area; and
perform scrolling of one of the first area and the second area that is determined to be scrolled based on movement of the specified touch point initiated in the second area.

10. An information processing device according to claim 9, wherein the first area includes a WEB page and the second area includes a map area which is displayed within the WEB page.

11. An information processing method, which is to be executed by an information processing device, the information processing method comprising:
displaying, on a display, a WEB page that includes a scrollable first area and a second area which is within the first area and which is scrollable independently of the first area;
receiving, information that specifies a touch point on the display and that instructs to scroll the WEB page corresponding to the specified touch point;
determining, a particular range of the display which is determined in response to a direction in which the first area has been scrolled by a last scroll instruction, wherein the particular range is determined a bottom section of the display in a case where the WEB page has been scrolled upward by the last scroll instruction, and is determined a top section of the display in a case where the WEB page has been scrolled downward by the last scroll instruction;
determining, in a case where a start point of a current scroll instruction is contained in the second area which is within the first area and the start point is contained in the particular range, that the first area is to be scrolled;
determining, in a case where the start point is contained in the second area which is within the first area and the start point is not contained in the particular range, that the second area is to be scrolled independently of the first area; and
performing scrolling of one of the first area and the second area that is determined to be scrolled based on movement of the specified touch point initiated in the second area, wherein during the scrolling the position and the size of the particular range are not changed.

12. An information processing method, which is to be executed by an information processing device, the information processing method comprising:
displaying, on a display, a WEB page that includes a scrollable first area and a second area which is within the first area and which is scrollable independently of the first area;
receiving, information that specifies a touch point on the display and that instructs to scroll the WEB page corresponding to the specified touch point;
determining scroll directions in the received scroll instructions;
determining, in a case where a start point of a current scroll instruction is contained in the second area which is within the first area and an angle between a scroll direction in the current scroll instruction and a scroll direction in a last scroll instruction is less than a given amount, that the first area is to be scrolled;
determining, in a case where the start point is contained in the second area which is within the first area and the scroll direction in the current scroll instruction and the angle between the scroll direction in the current scroll instruction and the scroll direction in the last scroll instruction is equal to or more than the given amount, that the second area is to be scrolled independently of the first area; and
performing scrolling of one of the first area and the second area that is determined to be scrolled based on movement of the specified touch point initiated in the second area.

13. An information processing method, which is to be executed by an information processing device, the information processing method comprising:
displaying, on a display, a WEB page that includes a scrollable first area and a second area which is within the first area and which is scrollable independently of the first area;
receiving information that specifies a touch point on the display and that instructs to scroll the WEB page corresponding to the specified touch point;
determining scroll speed of the received scroll instructions based on movement speed of the specified touch point;
determining, in a case where a start point of a current scroll instruction is contained in the second area which is within the first area and a difference between a scroll speed in the current scroll instruction and a scroll speed in a last scroll instruction is less than a given amount, that the first area is to be scrolled;
determining, in a case where the start point is contained in the second area which is within the first area and the difference between the scroll speed in the current scroll instruction and the scroll speed in the last scroll instruction is equal to or more than the given amount, that the second area is to be scrolled independently of the first area; and
performing scrolling of one of the first area and the second area that is determined to be scrolled based on movement of the specified touch point initiated in the second area.

14. An information processing method, which is to be executed by an information processing device, the information processing method comprising:

displaying, on a display, a WEB page that includes a scrollable first area and a second area which is within the first area and which is scrollable independently of the first area;

receiving information that specifies a touch point on the display and that instructs to scroll the WEB page corresponding to the specified touch point;

determining a scroll speed of the received scroll instructions based on a movement speed of the specified touch point;

determining, in a case where a start point of a current scroll instruction is contained in the second area which is within the first area and a scroll speed of the first area that is instructed by a last scroll instruction is equal to or higher than a predetermined value, that the first area is to be scrolled;

determining, in a case where the start point is contained in the second area which is within the first area and the scroll speed of the first area that is instructed by the last scroll instruction is lower than a predetermined value, that the second area is to be scrolled independently of the first area; and performing scrolling of one of the first area and the second area that is determined to be scrolled based on movement of the specified touch point initiated in the second area.

15. An information processing method, which is to be executed by an information processing device, the information processing method comprising:

displaying, on a display, a WEB page that includes a scrollable first area and a second area which is within the first area and which is scrollable independently of the first area;

receiving information that specifies a touch point on the display and that instructs to scroll the WEB page corresponding to the specified touch point;

determining in a case where that a start point of a current scroll instruction is contained in the second area which is within the first area and displaying all the area of the second area is finished, that the first area is to be scrolled;

determining, in a case where the start point is contained in the second area which is within the first area and displaying all the area of the second area is not finished, that the second area is to be scrolled independently of the first area; and performing scrolling of one of the first area and the second area that is determined to be scrolled based on movement of the specified touch point initiated in the second area.

* * * * *